United States Patent
Hu

(10) Patent No.: US 12,495,163 B2
(45) Date of Patent: Dec. 9, 2025

(54) METHOD, APPARATUS FOR PROCESSING MEDIA DATA, COMPUTER DEVICE AND STORAGE MEDIUM

(71) Applicant: Tencent Technology (Shenzhen) Company Limited, Guangdong (CN)

(72) Inventor: Ying Hu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 65 days.

(21) Appl. No.: 18/389,554

(22) Filed: Nov. 14, 2023

(65) Prior Publication Data

US 2024/0080487 A1 Mar. 7, 2024

Related U.S. Application Data

(63) Continuation of application No. PCT/CN2022/137850, filed on Dec. 9, 2022.

(30) Foreign Application Priority Data

Jan. 10, 2022 (CN) .......................... 202210024113.X

(51) Int. Cl.
| | |
|---|---|
| *H04N 19/70* | (2014.01) |
| *H04N 19/136* | (2014.01) |
| *H04N 19/172* | (2014.01) |
| *H04N 19/31* | (2014.01) |
| *H04N 19/597* | (2014.01) |

(52) U.S. Cl.
CPC ........... *H04N 19/70* (2014.11); *H04N 19/136* (2014.11); *H04N 19/172* (2014.11); *H04N 19/31* (2014.11); *H04N 19/597* (2014.11)

(58) Field of Classification Search
None
See application file for complete search history.

(56) References Cited

U.S. PATENT DOCUMENTS

| 2022/0014827 A1* | 1/2022 | Denoual | ............ H04N 21/2353 |
| 2022/0078515 A1* | 3/2022 | Yu | ....................... H04N 21/2362 |
| 2024/0040170 A1* | 2/2024 | Denoual | ............ H04N 21/2358 |

FOREIGN PATENT DOCUMENTS

| CN | 112565815 A | 3/2021 |
| CN | 112804256 A | 5/2021 |

OTHER PUBLICATIONS

International Search Report issued Feb. 16, 2023 in Application No. PCT/CN2022/137850, pp. 1-8.

* cited by examiner

*Primary Examiner* — Samuel D Fereja
(74) *Attorney, Agent, or Firm* — ArentFox Schiff LLP

(57) ABSTRACT

In a method for processing media data, signaling description information of the media data is received. The media data includes N media frames of a plurality of qualities that are encapsulated into M tracks to obtain a media file corresponding to each of the M tracks. The media frames encapsulated into a same track of the M tracks have a same quality of the plurality of qualities. The signaling description information includes combination indication information that indicates the media files allowed for combination decoding in the M media files. At least two media files are obtained according to the combination indication information. The media files correspond to at least two tracks in the M tracks having the same quality. The combination decoding is performed on the obtained at least two media files.

17 Claims, 6 Drawing Sheets

Obtain a signaling description file of media data, the signaling description file including combination indication information, and the combination indication information being used for indicating media files allowed for combination decoding in M media files — S401 request at least two media files according to the combination indication information, and perform combination decoding on each requested media file — S402

LCU: Largest coding unit
CU: Coding unit (image block)

METHOD, APPARATUS FOR PROCESSING MEDIA DATA, COMPUTER DEVICE AND STORAGE MEDIUM

RELATED APPLICATIONS

The present application is a continuation of International Application No. PCT/CN2022/137850 filed on Dec. 9, 2022, which claims priority to Chinese Patent Application No. 202210024113.X, entitled "DATA PROCESSING METHOD OF MEDIA DATA AND RELATED DEVICES" and filed on Jan. 10, 2022. The entire disclosures of the prior applications are hereby incorporated by reference.

FIELD OF THE TECHNOLOGY

This disclosure relates to the field of computer technologies, in particular to a data processing method of media data, a data processing apparatus of media data, a computer device, a storage medium and a computer program product.

BACKGROUND OF THE DISCLOSURE

In related immersive media transmission solutions, in scenes where media frames at multiple temporal levels and media frames with multiple quality coexist, at the encapsulation level of signaling description files, tracks at different temporal levels in the signaling description files are constrained, that is, in order to avoid the situation of combination decoding between media frames with different quality at different temporal levels, media frames at different temporal levels in the same track group are supported for combination decoding. However, the constraint provided by the related technology is mainly reflected at the file transmission level, and the content playback device needs to request media frames of all temporal levels and all quality before performing combination decoding, which will inevitably result in bandwidth waste.

SUMMARY

Embodiments of this disclosure provide a data processing method of media data, a data processing apparatus of media data, a computer device, a storage medium and a computer program product media file.

According to one aspect, provided is a method of processing media data. In the method, signaling description information of the media data is received. The media data includes N media frames of a plurality of qualities that are encapsulated into M tracks to obtain a media file corresponding to each of the M tracks. The media frames encapsulated into a same track of the M tracks have a same quality of the plurality of qualities. The signaling description information includes combination indication information that indicates the media files allowed for combination decoding in the M media files. At least two media files are obtained according to the combination indication information. The media files correspond to at least two tracks in the M tracks having the same quality. The combination decoding is performed on the obtained at least two media files.

According to another aspect, provided is a method of processing media data. In the method, N media frames of media data of a plurality of qualities are encapsulated into M tracks to obtain a media file corresponding to each of the M tracks. The media frames encapsulated into a same track of the M tracks have a same quality of the plurality of qualities. The media files corresponding to at least two tracks in the M tracks have the same quality. Signaling description information of the media data is generated according to the encapsulation of the N media frames of the media data. The signaling description information includes combination indication information that indicates the media files allowed for combination decoding in the M media files.

According to another aspect, provided is a data processing apparatus of media data. The data processing apparatus includes processing circuitry that is configured to receive signaling description information of the media data. The media data includes N media frames of a plurality of qualities that are encapsulated into M tracks to obtain a media file corresponding to each of the M tracks. The media frames encapsulated into a same track of the M tracks have a same quality of the plurality of qualities. The signaling description information includes combination indication information that indicates the media files allowed for combination decoding in the M media files. The processing circuitry is configured to obtain at least two media files according to the combination indication information, the media files corresponding to at least two tracks in the M tracks having the same quality. The processing circuitry is further configured to perform the combination decoding on the obtained at least two media files.

According to another aspect, provided is a data processing apparatus of media data. The data processing apparatus includes processing circuitry that is configured to encapsulate N media frames of media data of a plurality of qualities into M tracks to obtain a media file corresponding to each of the M tracks. The media frames encapsulated into a same track of the M tracks have a same quality of the plurality of qualities. The media files correspond to at least two tracks in the M tracks having the same quality. The processing circuitry is configured to generate signaling description information of the media data according to the encapsulation of the N media frames of the media data, the signaling description information including combination indication information that indicates the media files allowed for combination decoding in the M media files.

According to another aspect, provided is a computer device. The computer device includes one or a plurality of memories and processors. The memory stores at least one computer-readable instruction. When the at least one computer-readable instruction is executed by the one or plurality of processors, the one or plurality of processors perform any of the methods for processing media data.

According to another aspect, provided is one or a plurality of non-transitory computer-readable storage mediums. The computer-readable storage medium stores instructions which when executed by a processor cause the processor to perform any of the methods for processing media data.

According to another aspect, provided is a computer program product. The computer program product includes computer-readable instructions, and the computer-readable instructions are stored in a computer-readable storage medium. One or a plurality of processors of a computer device read the computer-readable instructions from the computer-readable storage medium, and the one or plurality of processors execute the computer-readable instructions, so that the computer device performs any of the methods for processing media data.

BRIEF DESCRIPTION OF THE DRAWINGS

To describe the technical solutions in the embodiments of this disclosure more clearly, the following briefly introduces the drawings for describing the embodiments. The embodiments are merely exemplary and additional embodiments are within the scope of the present disclosure.

DESCRIPTION OF EMBODIMENTS

Figure 1A:
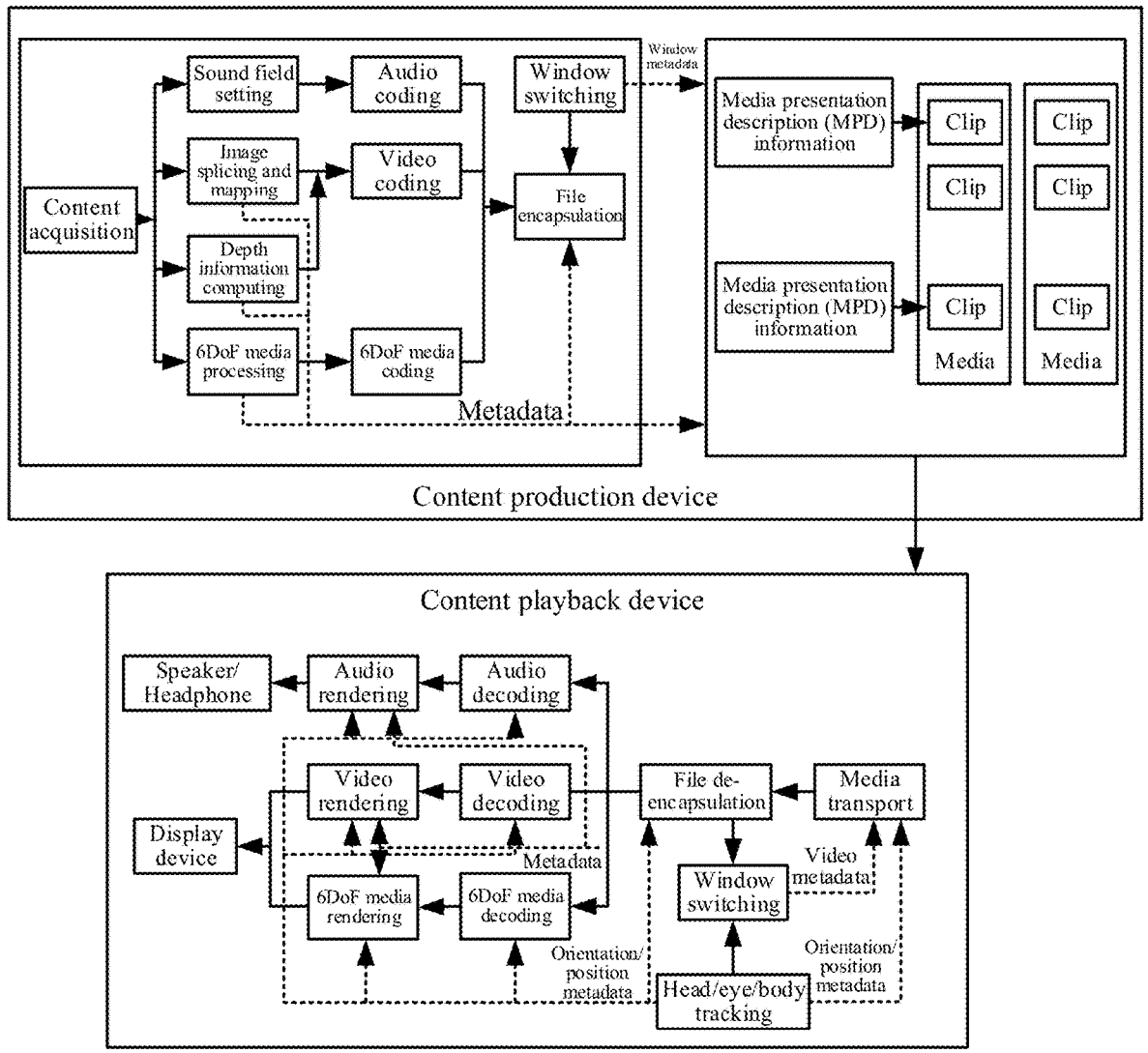
FIG. 1a shows an architecture diagram of a media data system provided in an exemplary embodiment of this disclosure.

Exemplary embodiments are described in detail herein, and examples of the exemplary embodiments are shown in the drawings. When the following description involves the drawings, unless otherwise indicated, the same numerals in different drawings represent the same or similar elements. The implementations described in the following exemplary embodiments do not represent all implementations consistent with this disclosure.

The embodiments of this disclosure relate to the data processing technology of media data. Specifically, the media data may include data or media content of an immersive media. The immersive media refers to a media file that can provide the immersive media content to allow users immersed in the media content to obtain visual, auditory, and other sensory experiences in the real world.

The immersive media may include video data and/or audio data, where the production and transmission processes of the immersive media may be shown in FIG. 1a. In the production and transmission processes of the immersive media, as shown in FIG. 1a, a content production device and a content playback device are mainly involved. The content production device may refer to a computer device used by a provider of the immersive media (such as a content production end of a point cloud media), and may also be referred to as a coding device. The content playback device may refer to a computer device used by a consumer of the immersive media (such as a content viewing user of a point cloud media), and may also be referred to as a decoding device. In some embodiments, the content production device may be a terminal (such as a personal computer (PC)), a smart mobile device (such as a smart phone), a server, or the like. The content playback device may be a terminal, a smart mobile device, a VR device (such as a VR helmet, VR glasses, or the like), an AR device, or the like.

Figure 1B:
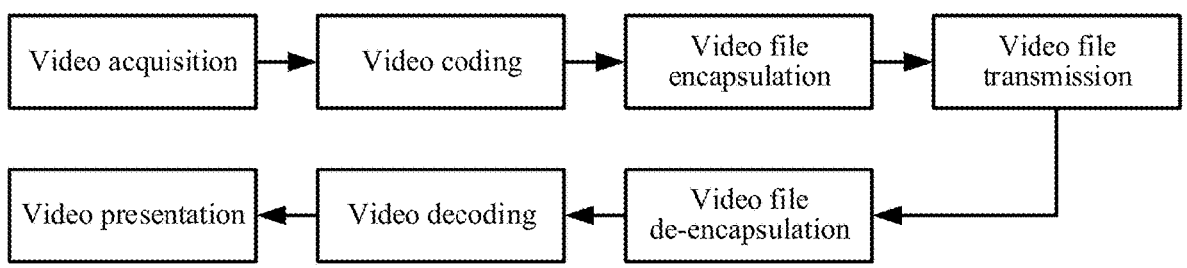
FIG. 1b shows a flowchart of video processing provided in an exemplary embodiment of this disclosure.

Generally, the production and transmission of the immersive media specifically include one or more stages (or processes) as follows: acquisition, coding, file encapsulation, file transmission, file de-encapsulation, decoding and final presentation. The production and transmission processes of the immersive media which is video data are described below with reference to FIG. 1b. As shown in FIG. 1b, the production and transmission processes of the video data specifically include one or more stages as follows: video acquisition, video coding, video file encapsulation, video file transmission, video file de-encapsulation, video decoding and final video presentation. Similarly, when the immersive media is a point cloud media, the production and transmission processes of the point cloud media also include one or more of the foregoing processing stages.

In more processing stages of the immersive media, the acquisition, coding, file encapsulation and file transmission are performed by the foregoing content production device, and the file de-encapsulation, decoding and final presentation are performed by the content playback device. The processing stages of the immersive media are described in detail below respectively based on the processes involved in the content production device and the processes involved in the content playback device.

1. Processes Involved in Content Production Device:

(1) Obtaining Process of Immersive Media:

The media content of the immersive media is obtained by acquiring audio-visual scenes in the real world by a capture device. In an embodiment, the capture device may refer to a hardware assembly arranged in the content production device. For example, the capture device refers to a microphone, a camera, a sensor, or the like of a terminal. In other embodiments, the capture device may also be a hardware apparatus which is independent of the content production device but is connected to the content production device, such as a camera connected to a server. The capture device may include but is not limited to: audio devices, camera devices and sensing devices.

It is to be understood that the captured audio content is the content suitable for audio coding of the immersive media, so there is no need to perform other processes on the captured audio content. The captured video content needs to undergo a series of production processes to obtain the content suitable for video coding of the immersive media. The production processes may specifically include:

① Splicing: since the captured video content of the immersive media is shot by the capture device from different perspectives, splicing refers to splicing the video content shot from various perspectives into a complete video that can reflect a 360-degree visual panoramic view of the real space, that is, the spliced video is a panoramic video represented in the 3-dimension (3D) space.

② Projection: projection refers to a process of mapping a 3D video formed by splicing onto a 2-dimension (2D) image, and the 2D image formed by projection is called a projection image. Projection methods may include but are not limited to: longitude and latitude map projection and regular hexahedron projection.

Figure 2A:
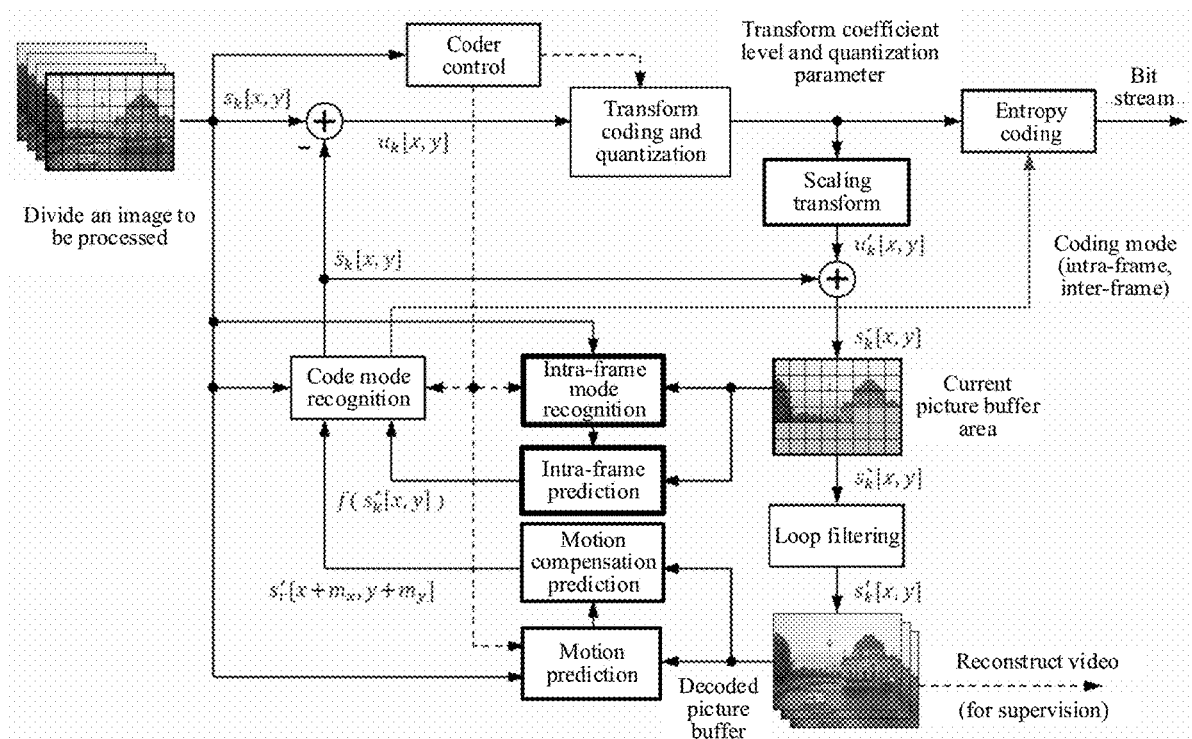
FIG. 2a shows a flow block diagram of video coding provided in an exemplary embodiment of this disclosure.
Figure 2B:
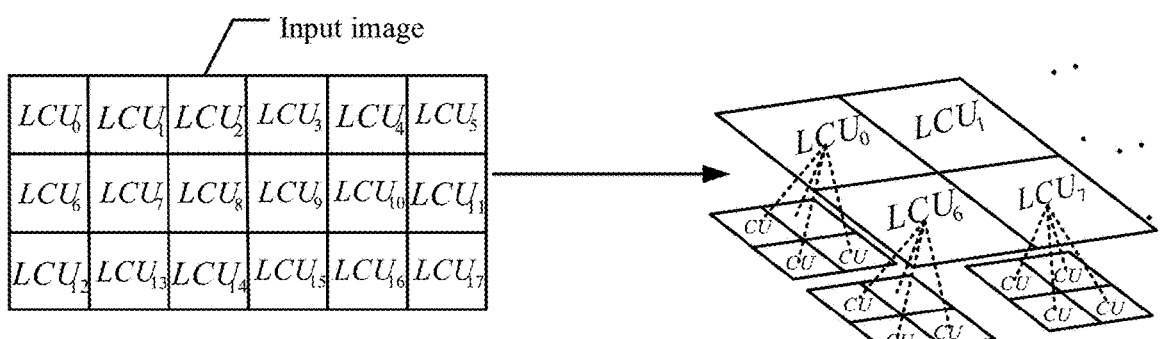
FIG. 2b shows a division schematic diagram of an input image provided in an exemplary embodiment of this disclosure.

(2) Coding of Immersive Media:

The projection image may be directly coded, or the projection image may be subjected to regional encapsulation and then coded. In modern mainstream immersive media coding technologies, taking the International Immersive Media Coding Standard HEVC (High Efficiency Video Coding), International Immersive Media Coding Standard VVC (Versatile Video Coding), and China's National Immersive Media Coding Standard AVS (Audio Video Coding Standard) as examples, a hybrid coding framework is used for performing a series of the following operations and processes on the inputted original immersive media signal. Referring to FIG. 2a, FIG. 2a shows a flow block diagram of coding of an immersive media provided in an exemplary embodiment of this disclosure. The coding process of the immersive media is introduced in detail below with reference to FIG. 2a:

1) Block partition structure: An input image (such as, image frames in the immersive media) is divided into a plurality of non-overlapping processing units according to the sizes of the processing units, and a similar compression operation is performed on each processing unit. The processing unit is called a coding tree unit (CTU) or a largest coding unit (LCU). The CTU may be more finely divided to obtain one or a plurality of basic coding units, each of which is called a coding unit (CU). Each CU is the most basic element in a coding process. FIG. 2b shows a division schematic diagram of an input image provided in an embodiment of this disclosure. The following describes various coding modes that may be used for each CU.

2) Predictive coding: The predictive coding includes an intra-frame prediction mode, an inter-frame prediction mode, or the like. After an original immersive media signal is predicted by a selected reconstructed immersive media signal, a residual immersive media signal is obtained. The content production device needs to select the most suitable predictive coding mode from many possible predictive coding modes for the current CU, and inform the content playback device.

3) Transform & Quantization: After discrete Fourier transform (DFT), discrete cosine transform (DCT) and other transform operations, the residual immersive media signal is converted into a transform domain, which is called a transform coefficient. A lossy quantization operation is further performed on the signal in the transform domain, and certain information is lost, so that the quantized signal is beneficial to compression expression. In some immersive media coding standards, there may be more than one transform mode, therefore, the content production device also needs to select one of the transform modes for the current CU, and inform the content playback device.

4) Entropy coding or statistical coding: The quantized transform domain signal will be statistically compressed and coded according to the frequency of occurrence of each value, and finally, a binary (0 or 1) compressed code stream will be outputted. Furthermore, for other information generated by coding, such as a selected mode and a motion vector, the entropy coding is also required to reduce the code rate. The statistical coding is a lossless coding mode which may effectively reduce the code rate required for expressing a same signal. Common statistical coding modes include variable length coding (VLC) or content adaptive binary arithmetic coding (CABAC).

5) Loop filtering: After the operations of inverse quantization, inverse transform and predictive compensation (reverse operations of the foregoing 2 to 4) on the coded image, a reconstructed decoded image may be obtained. Compared with an original image, some information of the reconstructed image is different from that of the original image due to the influence of quantization, resulting in distortion. The reconstructed image is subjected to filtering operations, such as deblocking, sample adaptive offset (SAO) filter or adaptive loop filter (ALF), so that the distortion degree caused by quantization may be effectively reduced. Since these filtered reconstructed images will be used as a reference for subsequent coded images to predict future signals, the foregoing filtering operation is also called loop filtering, that is, the filtering operation in a coded loop.

In the technology of transmitting video data in the immersive media, a streaming transmission technology is usually used for handling the transmission of media resources between a server and a client. Common media streaming transmission technologies include dynamic adaptive streaming over HTTP (hyper text transfer protocol) (DASH), HTTP live streaming (HLS), smart media transport (SMT), and the like. Taking DASH as an example, DASH is an adaptive bit rate streaming technology which may enable a high-quality streaming media to be transmitted over the Internet through a HTTP network server. DASH will divide the content into a series of small HTTP-based file clips, each clip includes a very short playable content, and the total length of the media content of the immersive media may reach several hours (such as movies or live sports events). The media content will be made into alternative clips with multiple bit rates to provide multiple bit rate versions for selection. That is to say, after an immersive media with higher quality is obtained, the media content of the immersive media (such as the video data of the immersive media) will be made into media data with different quality, so that the content playback device may select the media data with the corresponding quality subsequently for combination consumption. For example, the media content of an immersive media may be made into alternative clips at two bit rates, thus the media data produced from the media content of the immersive media includes media frames at the two bit rates. Therefore, when the immersive media is requested to be played by the DASH client (such as, the content playback device), the client will automatically select an alternative solution to download and play according to the current network conditions. The client will select the clip with the highest bit rate that can be downloaded in time for playback, so as to avoid the frame freezing event or re-buffering event. Therefore, the DASH client can seamlessly adapt to constantly changing network conditions and provide a high-quality playback experience with fewer frame freezing and re-buffering occurrences.

The DASH uses HTTP network server infrastructures. It allows devices such as Internet TVs, TV set-top boxes, desktop computers, smart phones, tablet personal computers, and the like to consume the multimedia content transmitted over the Internet (such as videos, television programs, and broadcasts), and can cope with changing Internet receiving conditions.

(3) Encapsulation of Immersive Media File:

After the immersive media is coded, the coded data flow needs to be encapsulated and transmitted to the user. The encapsulation of an immersive media file refers to storing the coded and compressed video data and audios in a certain format in a file container (or a track1 according to an encapsulation format (or a container, or a file container). Common encapsulation formats include an audio video interleaved (AVI) format and an international standard organization (ISO) based media file format (ISOBMFF), where the ISOBMFF is an encapsulation standard for media files. The most typical ISOBMFF file is the moving picture experts group 4 (MP4) file. It can be understood that since the media content of the immersive media is made into media data with different quality, when encapsulating the media data with different quality, the content production device needs to encapsulate the media frames in the media data with different quality, so as to obtain a corresponding encapsulated file (also known as a media file resource). The encapsulated file may be a media file of an immersive media formed by a media file or a media clip, and according to the requirement for the file format of the immersive media, media presentation description (MPD) information is used for recording the metadata of the media file resource of the immersive media. The metadata is a general term for information related to the presentation of the immersive media. The metadata may include description information for encapsulated media frames, description information for windows, signaling information related to presentation, and the like. In some embodiments, in the encapsulated file, a sample is used as an encapsulation unit in a file encapsulation process, and one encapsulated file includes a plurality of samples. In other words, in the encapsulation process of the media file, a media frame is usually encapsulated as a sample to generate an encapsulated file.

In some embodiments, the metadata recorded by the MPD information may also be referred to as a signaling description file. Due to the differences in the media frames encapsulated into different tracks in the embodiments of this disclosure, the media files obtained after the media frames are encapsulated into each track also have differences. When the content playback device requests content consumption, it is generally necessary to perform combination consumption on the media frames with the same quality. As a result, in order to facilitate the content playback device to perform combination consumption, in the embodiments of this disclosure, it is proposed to add corresponding combination indication information to the signaling description file of the content production device, so that the content playback device may request at least two of the obtained media files based on the indication of the combination indication information, and perform combination decoding on each requested media file.

2. Processes Involved in Content Playback Device:

(1) File De-Encapsulation Process of Immersive Media:

After obtaining the signaling description file (such as, MPD information) transmitted by the content production device, the content playback device may request different media files based on the combination indication information in the signaling description file, and perform subsequent combination decoding. The media file resource (such as, the foregoing media file) obtained after the media frames are encapsulated into different tracks and the MPD information are transmitted from the content production device to the content playback device through a transmission mechanism (such as the DASH or the SMT). The file de-encapsulation process of the content playback device is opposite to the file encapsulation process of the content production device. The content playback device de-encapsulates the media file resource according to the requirement for the file format of the media, so as to obtain the decoded stream of the immersive media.

(2) Decoding and Presentation Processes of Immersive Media:

The decoding process of the content playback device is opposite to the coding process of the content production device. The content playback device performs audio decoding on the audio stream to restore the audio content. In addition, the decoding process of the stream of the immersive media performed by the content playback device includes: ① The stream of the immersive media is decoded to obtain a flat projection image. ② The projection image is reconstructed according to the MPD information and then converted into a 3D image. The reconstruction here refers to the process of re-projecting a 2D projection image into the 3D space.

According to the foregoing coding process, it can be seen that at the content playback device, for each CU, after the content playback device obtains the compressed stream, entropy decoding is performed first to obtain various mode information and quantized transform coefficients. Each coefficient is inversely quantized and inversely transformed to obtain a residual signal. On the other hand, according to the known coding mode information, a predicted signal corresponding to the CU may be obtained, and after the two are added, a reconstructed signal may be obtained. Finally, the reconstruction value of the decoded image needs to be subjected to loop filtering to generate a final output signal. The decoding process involves decoding the coded media frames obtained from different tracks and performing the final rendering presentation after decoding.

Figure 3A:
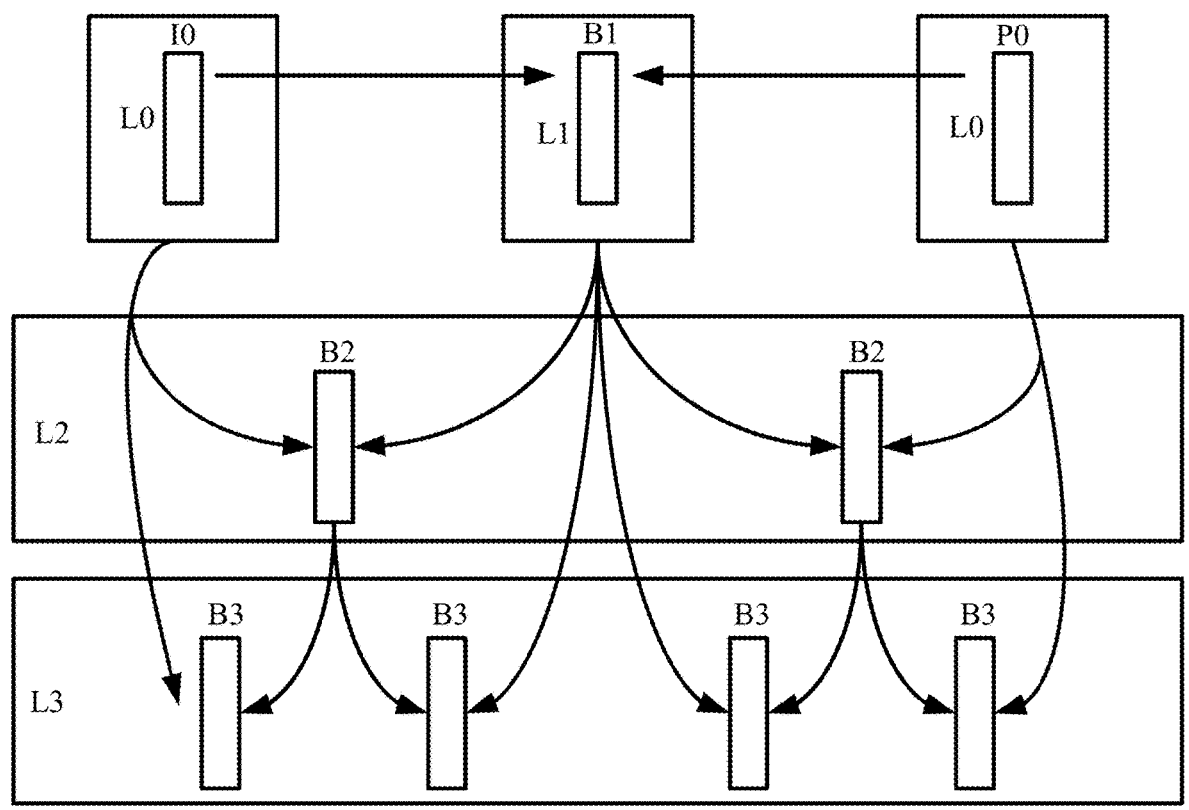
FIG. 3a shows a division schematic diagram of temporal levels provided in an exemplary embodiment of this disclosure.

In video coding technologies, a temporal layering technology is also involved. This technology may divide different video frames into different temporal levels according to the dependency relationship during decoding. It can be understood that when the temporal layering technology is used for division of temporal levels, video frames which are divided into video frames with lower levels do not need to refer to video frames with higher levels during decoding. Referring to FIG. 3a, FIG. 3a shows a division schematic diagram of temporal levels provided in an exemplary embodiment of this disclosure. As shown in FIG. 3a, arrows represent the dependency relationship during decoding. The arrow from the frame I0 to the frame B1 represents that the frame B1 needs to refer to the frame I0 for decoding, that is, the decoding of the frame B1 needs to rely on the decoding of the frame I0. The relationship between other frames is similar. According to the inter-frame dependency relationship indicated by the arrows in FIG. 3a, it can be seen that all video frames are divided into four temporal levels L0 to L3 according to the inter-frame dependency relationship, and video frames belonging to each temporal level do not rely on higher-level video frames during decoding. It is to be understood that low and high temporal levels mentioned in the embodiments of this disclosure are relative concepts. In the four temporal levels L0 to L3 determined in FIG. 3a, for the temporal level L0, L1 to L3 are all high temporal levels, but for the temporal level L1, the temporal level L3 is a higher temporal level than L1, and the temporal level L0 is a lower temporal level than L1. As shown in FIG. 3a, the types of video frames mainly include a frame I (intra slice), a frame B and a frame P, where the frame I is also known as a key frame belonging to intra-frame compression, and only the information of the frame I needs to be referenced during decoding; the frame B is a bidirectional predictive coding frame, and it is necessary to refer to both the previous frames and the frames to be decoded later during decoding; and the frame P is a forward predictive coding frame, that is, the frame P needs to refer to the previous relevant frames for decoding. In FIG. 3a, Arabic numeral subscripts added for the frame I, the frame B and the frame P are used for representing corresponding temporal levels. Based on the characteristics of the three types of video frames, namely the frame I, the frame P and the frame B during decoding, in order to ensure that after the division of temporal levels, in video frames belonging to each temporal level, video frames belonging to a low temporal level do not rely on a high temporal level during decoding, it can be understood that video frames belonging to the lowest temporal level (such as the temporal level L0 mentioned above) do not rely on any other temporal levels during decoding, that is, the video frames belonging to the lowest temporal level may be independently decoded and displayed, so the video frames divided into the lowest temporal level necessarily include the frame I.

Since during division of temporal levels of video frames, video frames belonging to a low temporal level do not need to refer to video frames belonging to a high temporal level during decoding, as shown in FIG. 3a, assuming that video frames in an immersive media include four temporal levels L0 to L3 and the arrows in FIG. 3a are used for representing the dependency relationship between video frames during decoding, in other words, the arrow from the frame I0 to the frame B1 represents that the frame B1 at the temporal level L1 needs to refer to the frame I0 at the temporal level L0 during decoding, the frame B1 at the temporal level L1 needs to refer to the frame P0 at the temporal level L0 during decoding, the first frame B2 at the temporal level L2 needs to refer to the frame I0 at the temporal level L0 and the frame B1 at the temporal level L1 during decoding, the second frame B2 at the temporal level L2 needs to refer to the frame B1 at the temporal level L1 and the frame P0 at the temporal level L0 during decoding, the first frame B3 at the temporal level L3 needs to refer to the first frame B2 at the temporal level L2 and the frame I0 at the temporal level L0 during decoding, the second frame B3 at the temporal level L3 needs to refer to the first frame B2 at the temporal level L2 and the frame B1 at the temporal level L1 during decoding, the third frame B3 at the temporal level L3 needs to refer to the frame B1 at the temporal level L1 and the second frame B2 at the temporal level L2 during decoding, and the fourth frame B3 at the temporal level L3 needs to refer to the second frame B2 at the temporal level L2 and the frame P0 at the temporal level L0 during decoding.

The processes of making the media content of the immersive media into media data with different quality, encapsulating the media frames in the media data with different quality into a plurality of tracks to generate corresponding encapsulated files, and adding corresponding combination indication information to the signaling description file generated for the encapsulation process of the media data mentioned in the embodiments of this disclosure are mainly aimed at the immersive media as a point cloud media, but are also applicable to ordinary video media data. The production and encapsulation as well as transmission and consumption processes of the point cloud media are mainly described below. In addition, it is to be understood that after the media data is encapsulated into different tracks, a media file (representation) corresponding to each track is obtained, where the obtained media file may also be referred to as a transmission stream or a media resource.

Figures 3B, 4:
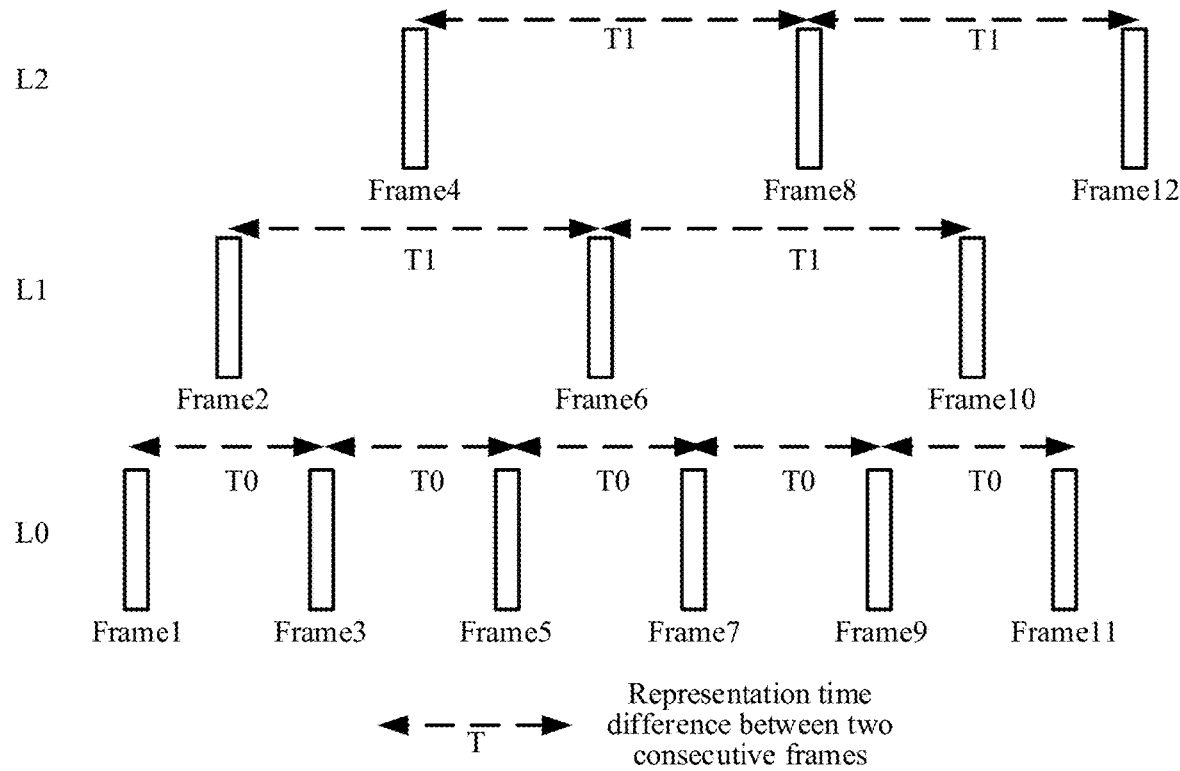
FIG. 3b shows another division schematic diagram of temporal levels provided in an exemplary embodiment of this disclosure.
FIG. 4 shows a flowchart of a data processing method provided in an exemplary embodiment of this disclosure.

Similar to the division of temporal levels for video frames in ordinary videos, for the point cloud media, there is also a temporal layering technology similar to that mentioned above. In the embodiments of this disclosure, for the point cloud media, media frames in the point cloud media may also be divided to different temporal levels, and different temporal levels are encapsulated into different tracks. Referring to FIG. 3b, FIG. 3b shows another division schematic diagram of temporal levels provided in an exemplary embodiment of this disclosure. As shown in FIG. 3b, in the point cloud media, assuming that the point cloud media includes 12 media frames (Frame1, Frame2, Frame3, . . . Frame12), the 12 media frames may be divided to temporal levels according to time dimensions. For example, six media frames, namely Frame1, Frame3, Frame5, Frame1, Frame9 and Frame11, with a time interval of T0, may be divided to the temporal level L0; three media frames, namely Frame2, Frame6 and Frame10, with a time interval of T1, may be divided to the temporal level L1; and three media frames, namely Frame4, Frame8 and Frame12, with a time interval of T1, may be divided to the temporal level L2. T0 represents the representation time difference between any two adjacent media frames at the temporal level L0. For example, T0 may represent the representation time difference between the Frame1 and the Frame3, and T0 may also represent the representation time difference between the Frame3 and the Frame5. In addition, T1 represents the representation time difference between any two adjacent media frames at the temporal level L1. For example, T1 may represent the representation time difference between the Frame2 and the Frame6, and T1 may also represent the representation time difference between the Frame6 and the Frame10. Of course, T1 may also represent the representation time difference between any two adjacent media frames at the temporal level L2. For example, T1 may represent the representation time difference between the Frame4 and the Frame8, and T1 may also represent the representation time difference between the Frame8 and the Frame12.

For the point cloud media, a point cloud compression (PCC) technology is further involved. The PCC technology specifically may be divided into a geometry-based point cloud compression (G-PCC) technology and a video-based point cloud compression (V-PCC) technology.

In some embodiments, although only the combination of media frames with appropriate quality (such as, the same quality) can be consumed by users, due to the compression and coding methods for the media content of the point cloud media, media data including media frames with different quality will be obtained. Therefore, in order to enable the content playback device to obtain the combination restrictions between media frames with different quality at different temporal levels in advance, when encapsulating media frames with different quality, the content production device may add the combination indication information for different media files to the generated corresponding signaling description files, so as to avoid the content playback device from requesting media frames of all temporal levels and quality in advance, thereby achieving the purpose of accurately requesting and consuming the appropriate combination of media frames, so as to effectively save the bandwidth for the content playback device. The specific implementation steps for the content production device to define and indicate the strategy of selecting a combination of media frames with specific quality during combination consumption of media frames at different temporal levels are as follows:

1. The content production device organizes the encapsulated files in the form of video streams (such as, one or a plurality of media files (representations)) and generates corresponding signaling description files according to the structures of the encapsulated files corresponding to the media data produced by the immersive media, and the temporal level information and quality information in the media files obtained after media frames are encapsulated into each track, and indicates generation of combination indication information of a plurality of media files according to the temporal level information and quality information in the media files in the signaling description files.

2. The content production device transmits the signaling description files to the content playback device.
3. After obtaining the signaling description files, the content production device requests appropriate media files for consumption decoding according to the own needs, network conditions or decoding ability in conjunction with the temporal level information, quality information and combination indication information in the signaling description files.

To support the foregoing steps, in the embodiments of this disclosure, the corresponding combination indication information may be added to signaling description information. The corresponding combination indication information may be added by adding descriptive fields at the system layer, and the extension includes field extension at the signaling description file level to support the specific implementation steps related to this disclosure. In some embodiments, FIG. 4 shows a flowchart of a data processing method of media data provided in an exemplary embodiment of this disclosure. The method may be performed by the content playback device (also known as decoding device) in the media data system. It can be understood that the content playback device includes a terminal device (or client) used by a user who consumes the immersive media content. The method includes the following steps S401 to S402:

In step S401, a signaling description file of media data is obtained, the signaling description file including combination indication information, and the combination indication information being used for indicating media files allowed for combination decoding in M media files.

In the embodiments of this disclosure, the media data includes N media frames, and the N media frames are respectively encapsulated into M tracks, where the N media frames are respectively encapsulated into the M tracks to obtain media files corresponding to each track, the quality of the media frames encapsulated into a same track is the same, and the quality of the media files corresponding to at least two tracks in the M tracks is the same; and N≥M, and both N and M are integers greater than 1. It can be understood that the N media frames are a plurality of media frames with different quality produced by an immersive media. For example, the N media frames may be a plurality of media frames with different quality obtained by G-PCC compression. For example, when the G-PCC compression is used, a plurality of media frames with different quality may be obtained by compressing the media data at various code rates. When media frames with different quality are encapsulated respectively, in order to avoid the encapsulation of media frames with different quality in a same track, resulting in media frames with different quality appearing in the obtained media files, which may lead to subsequent errors in combination decoding, the content production device generally encapsulates a plurality of media frames with the same quality into a plurality of different tracks, while media frames with different quality are generally not encapsulated into the same track. For example, the content production device may encapsulate a plurality of media frames with quality 1 into two different tracks respectively, encapsulate a plurality of media frames with quality 2 into two different tracks respectively, and encapsulate media frames with quality 1 and media frames with quality 2 into two different tracks respectively. In some embodiments, when encapsulating media data, the content production device also encapsulates media frames belonging to different temporal levels into different tracks respectively based on the temporal level to which each media frame belongs.

In some embodiments, based on the encapsulation process of media frames with different quality, the content production device obtains media files corresponding to each track, and generates a corresponding signaling description file. The signaling description file of the media data obtained by the content playback device is generated after the content production device encapsulates the media data, and the signaling description file may be received through the DASH transport protocol, where the signaling description file includes combination indication information, and the combination indication information is used for indicating media files allowed for combination decoding in M media files obtained by encapsulation. By this way, after obtaining the signaling description file, the content playback device can request at least two media files for consumption decoding from the M media files according to the combination indication information in the signaling description file, the own needs, network conditions or decoding ability, and the indication of the combination indication information.

In some embodiments, the N media frames are divided into a plurality of temporal levels, and one temporal level includes one or a plurality of media frames. A media file is obtained after corresponding media frames are encapsulated into a track (representation), and one media file includes media frames of one or a plurality of temporal levels. The combination indication information includes a temporal level combination descriptor, and the temporal level combination descriptor is used for defining the allowed combination modes between media files of different temporal levels.

Assuming that N media frames are respectively represented as: f1, f2, f3, . . . , f12, where f1 to f6 are media frames with quality 1, f7 to f12 are media frames with the same content but different quality (specifically quality 2), which correspond to f1 to f6 one by one, the temporal level corresponding to f1, f3 and f5 is L1, the temporal level corresponding to f2, f4 and f6 is L2, the temporal level corresponding to f7, f9 and f11 is L3, and the temporal level corresponding to f8, f10 and f12 is L4. Assuming that L1 is encapsulated into a track1, L2 is encapsulated into a track2, L3 is encapsulated into a track3, and L4 is encapsulated into a track4, the media file obtained after the media frames are encapsulated into the track1 may be represented as a representation1, the media file obtained after the media frames are encapsulated into the track2 may be represented as a representation2, the media file obtained after the media frames are encapsulated into the track3 may be represented as a representation3, and the media file obtained after the media frames are encapsulated into the track4 may be represented as a representation4.

In this embodiment, the division of N media frames can be achieved based on temporal levels, and then, the N media frames can be encapsulated on the basis of the division of the N media frames, thereby achieving the acquisition of the media file corresponding to the track after the corresponding media frames are encapsulated into the track. In addition, the temporal level combination descriptor can also be used for achieving the definition of the allowed combination modes between media files of different temporal levels. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In the embodiments of this disclosure, the signaling description file may be a description file (MPD signaling)

for describing media clip information. In some embodiments, taking the form of an extended DASH signaling description file as an example, combination indication information of media files is defined, and the combination indication information includes a temporal level combination descriptor. The temporal level combination descriptor is explained below.

In some embodiments, a new temporal level combination descriptor may be defined directly in the DASH signaling description file.

In some embodiments, a SupplementalProperty element with the @schemeIdUri attribute value of "um: mpeg: mpegI: gpcc: 2020: temporalLevelCombination" may be used for representing a temporal level combination descriptor. The temporal level combination descriptor is used for defining the allowed combination modes between representations (media files) of different temporal levels.

It can be understood that in the DASH signaling description file, media clip information can be described through the MPD signaling; and in the DASH signaling description file, one DASH signaling description file may include one or a plurality of Adaptation Sets (in DASH, a set of one or a plurality of video streams, and one Adaptation Set may include a plurality of media files). Thus, one MPD signaling may include one or a plurality of temporal level combination descriptors.

In some embodiments, one media file corresponds to one temporal level combination descriptor, and the temporal level combination descriptor includes combination identification elements, where the value of the combination identification element is used for indicating the media file allowed for combination decoding.

In this embodiment, by enabling the media files to correspond to the temporal level combination descriptors, the combination identification elements in the media files may correspond to the combination identification elements in the temporal level combination descriptors; and by using the values of the combination identification elements for indicating the media files allowed for combination decoding, the media files allowed for combination decoding can be distinguished by the values of the combination identification elements. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, the syntax and semantics of the temporal level combination descriptor may be shown in Table 1:

As shown in Table 1, the combination identification element in the temporal level combination descriptor may be an element in an existing descriptor. By directly taking the element in the existing descriptor as the combination identification element, the combination identification element can be determined, which is favorable for using the value of the combination identification element for distinguishing the media files allowed for combination decoding. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

For example, the element in a related temporal level combination descriptor may include "TemporalLevelCombination", thus the combination identification element mentioned in the embodiments of this disclosure may be the element "TemporalLevelCombination@id" in the existing descriptor. Moreover, the value (id) of the combination identification element is used for indicating the media file allowed for combination decoding. In some embodiments, the value of a combination identification element may be equal to an identifier of a media file. For example, if TemporalLevelCombination@id=1, it indicates that the media file allowed for combination decoding is the representation1. For another example, if TemporalLevelCombination@id=2, it indicates that the media file allowed for combination decoding is the representation2, and the like.

In some embodiments, the combination identification element in the temporal level combination descriptor may also be an element in a newly added temporal level combination descriptor.

In this embodiment, by taking the element in the newly added temporal level combination descriptor as the combination identification element, the combination identification element can be determined, which is favorable for using the value of the combination identification element for distinguishing the media files allowed for combination decoding. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

For example, the relevant definitions of the related combination identification element are as follows:

TABLE 1

Syntax and semantics of temporal level combination descriptor

| Combination identification element and value of temporal level combination descriptor | Use | Description |
| --- | --- | --- |
| TemporalLevelCombination | 0 . . . N (N is a positive integer) | Specify an allowed temporal level combination scope |
| TemporalLevelCombination@id | Mandatory | When the content playback device needs to combine a plurality of media files corresponding to different temporal levels, only select one or a plurality of media files from a set of media files including the same TemporalLevelCombination@id for requesting |

A SupplementalProperty element with a @schemeIdUri attribute equal to "urn:mpeg:mpegI:gpcc:2020:temporallevelIds" is referred to as GPCCTemporalLevelId descriptor.

A GPCCTemporalLevelId descriptor is used to identify the different temporal levels present in a Representation of a G-PCC content.

At most one GPCCTemporalLevelId descriptor shall be present at the Representation level for the G-PCC media when the G-PCC media is stored in multiple temporal level tracks.

At most one GPCCTemporalLevelId descriptor may be present at the Representation level for the G-PCC media when the G-PCC component media samples are divided into multiple temporal levels and all temporal level samples are stored in a single temporal level track.

The GPCCTemporalLevelId descriptor shall not be present at the Representation level when the G-PCC media samples are not divided based on temporal levels.

The @value attribute of the GPCCTemporalLevelId descriptor shall not be present.

For the combination identification element which is the element in the existing temporal level combination descriptor, the syntax and semantics of the temporal level combination descriptor may be shown in Table 2:

TemporalLevelCombination@id=2, it indicates that the media file allowed for combination decoding is the representation2, and the like.

In some embodiments, the temporal level combination descriptor is encapsulated in the Adaptation Set level of the signaling description file; or the temporal level combination descriptor is encapsulated in the Representation level of the signaling description file; or the temporal level combination descriptor is encapsulated in the Preselection level of the signaling description file. In other words, the temporal level combination descriptor may be used for describing media resources at the Representation, AdaptationSet or Preselection level. The AdaptationSet may include one or a plurality of representations, and the Preselection may also include one or a plurality of representations. When the temporal level combination descriptor is used for describing media resources at the AdaptationSet or Preselection level, it means that all representations in the AdaptationSet or Preselection level correspond to the same TemporalLevelCombination@id; or all representations in the AdaptationSet or Preselection level correspond to the same GPCCTemporalLevelId@combinationId.

In this embodiment, by encapsulating temporal level combination descriptors in different levels, the description

TABLE 2

Syntax and semantics of temporal level combination descriptor

| Attributes for GPCCTemporalLevelId descriptor | Use | Data type (Data Type) | Description |
|---|---|---|---|
| gpcc:@temporal_level_Ids | M | xs:UintVectorType | A list of space-separated temporal level identifiers for the temporal levels present in the G-PCC track of the Representation stream. |
| GPCCTemporalLevelId@combinationId | O | xs:UintType | When the content playback device needs to combine a plurality of media files corresponding to different temporal levels, only select one or a plurality of media files from a set of media files including the same GPCCTemporalLevelId@combinationId for requesting |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

As shown in Table 2, the combination identification element in the temporal level combination descriptor may be the element "GPCCTemporalLevelId@combinationId" in a newly added temporal level combination descriptor. It can be understood that the position of the newly added element in the temporal level combination descriptor can be customized, and the position of the newly added element is not specifically limited in the embodiments of this disclosure. For example, the position of the newly added element may be determined as a start position, an end position or any position in the text. Similarly, the value of the combination identification element is used for indicating the media file allowed for combination decoding. In some embodiments, the value of a combination identification element may be equal to an identifier of a media file. For example, if TemporalLevelCombination@id=1, it indicates that the media file allowed for combination decoding is the representation1. For another example, if of media resources at different levels can be achieved by the temporal level combination descriptors, and then, the temporal level combination descriptors can be used for achieving the definition of the allowed combination modes between media files of different temporal levels respectively at different levels. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

It is to be understood that in addition to defining the temporal level combination descriptors mentioned above (including combination identification elements which are elements in the existing descriptor and elements in the extended temporal level combination descriptor) in the combination indication information, the embodiments of this disclosure may further provide the following three ways to achieve the generation of the combination indication information.

In some embodiments, the generation of the combination indication information may be achieved by imposing relevant constraints in the form of text in standards.

In some embodiments, in a case that the media data is stored in a plurality of temporal level tracks and any one of the temporal level tracks has a replaceable track, the any one of the temporal level tracks generates a corresponding replaceable track according to target constraint rules. Thus, M tracks may include a plurality of temporal level tracks and replaceable tracks corresponding to the plurality of temporal level tracks respectively. A corresponding media file is obtained after corresponding media frames are encapsulated into a track. For each temporal level track in a plurality of temporal level tracks, the quality of the media frames in the first media file corresponding to a target temporal level track is the same, and for a target replaceable track corresponding to the target temporal level track, the quality of the media frames in the second media file corresponding to the target replaceable track is different from the quality of the media frames in the first media file.

In this embodiment, by generating the corresponding replaceable track according to target constraint rules, the acquisition of the replaceable track can be achieved, which is convenient for providing multiple modes of combination decoding based on a plurality of temporal level tracks and replaceable tracks to achieve the purpose of combination limitation, so as to select appropriate media files for consumption decoding, thereby achieving the purpose of accurately requesting corresponding media frames without the need to request all media files, so as to save the transmission bandwidth.

For example, assuming that the media data is stored in temporal level tracks track1 and track2, the track1 has a replaceable track track1', and the track2 has a replaceable track track2', where both the replaceable tracks track1' and track2' are generated according to target constraint rules, if the quality of the media frames in the corresponding media file in the temporal level track track1 is high quality, the quality of the media frames in the corresponding media file in the replaceable track track1' corresponding to the track1 is low quality; and if the quality of the media frames in the corresponding media file in the temporal level track track2 is high quality, the quality of the media frames in the corresponding media file in the replaceable track track2' corresponding to the track2 is also low quality.

It is to be understood that the concepts of the high quality and the low quality are relative. In some embodiments, the quality of media frames can be determined according to a resolution. For example, a user can customize a resolution threshold, where if the resolution of the media frame f1 is greater than the resolution threshold, the media frame f1 is a high-quality media frame; and if the resolution of the media frame f2 is less than or equal to the resolution threshold, the media frame f2 is a low-quality media frame.

In some embodiments, for a point cloud media, the quality of media frames may be determined according to the components of the point cloud (which may include attribute components and geometric components), where the attribute components may include but are not limited to color (such as RGB (Red, Green, Blue)) attributes, and the geometric components may include but are not limited to position information (such as spatial coordinates, including x-axis coordinates, y-axis coordinates and z-axis coordinates in a spatial coordinate system). For example, assuming that the attribute component of the media frame f1 of the point cloud media is an attribute1, and the attribute component of the media frame f2 of the point cloud media is an attribute2, the media frame f1 and the media frame f2 are two media frames with different quality. For another example, assuming that the geometric component of the media frame f3 of the point cloud media is a geometry1, and the geometric component of the media frame f4 of the point cloud media is a geometry2, the media frame f3 and the media frame f4 are two media frames with different quality. For another example, assuming that the geometric component of the media frame f5 of the point cloud media is a geometry1, and the attribute component of the media frame f6 of the point cloud media is an attribute1, the media frame f5 and the media frame f6 are also two media frames with different quality.

It can be understood that the media frames in the media file corresponding to the temporal level track track1 are the same as the media frames in the media file corresponding to the replaceable track track1', except for their different quality. Similarly, the media frames in the media file corresponding to the temporal level track track2 are the same as the media frames in the media file corresponding to the replaceable track track2', except for their different quality.

In some embodiments, the combination indication information includes a quality identifier of each media file, and the value of the quality identifier is used for indicating the quality of the media frames in a media file, where the media files including the quality identifiers with the same value are allowed for combination decoding. For example, the quality identifier may be represented as @quality Ranking, thus @quality Ranking=1 may represent quality1, @quality Ranking=2 may represent quality2, and @quality Ranking=3 may represent quality3. If the quality identifier in the representation1 is @quality Ranking=1, and the quality identifier in the representation2 is @quality Ranking=1, the representation1 and the representation2 are allowed for combination decoding. If the quality identifier in the representation1 is @quality Ranking=1, and the quality identifier in the representation2 is @quality Ranking=2, the representation1 and the representation2 are not allowed for combination decoding. In this embodiment, by using the value of the quality identifier for indicating the quality of the media frames in the media files, the media files allowed for combination decoding can be distinguished by the value of the quality identifier. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, the generation of the combination indication information may be achieved by using associationId (such as, association identifier) to associate different representations.

In some embodiments, the temporal level track and the replaceable track correspond to a replaceable level respectively, and tracks with the same replaceable level form a track group. The combination indication information includes an association identifier and an association type identifier. The value of the association identifier corresponding to the media file corresponding to an $i^{th}$ track is determined by a file identifier of the media file corresponding to the track with the same replaceable level as the $i^{th}$ track, and the value of the association type identifier is used for indicating the type of relationship between corresponding media files. The value of the association type identifier corresponding to the media file corresponding to the $i^{th}$ track represents the type of a track group where the $i^{th}$ track is located, where i is a positive integer, and i≤M.

For example, assuming that the media data is stored in temporal level tracks track1 and track2, the track1 has a replaceable track track1', and the track2 has a replaceable track track2', the replaceable level corresponding to the temporal level tracks track1 and track2 is a level1, and the replaceable level corresponding to the replaceable tracks track1' and track2' is a level2. Then, the temporal level tracks track1 and track2 may belong to a track group 1, and the replaceable tracks track1' and track2' may belong to a track group 2. If the media file corresponding to the temporal level track track1 is represented as a representation1, the media file corresponding to the temporal level track track2 is represented as a representation2, the media file corresponding to the replaceable track track1' is represented as a representation3, and the media file corresponding to the replaceable track track2' is represented as a representation4, the value of the associationid of the representation1 corresponding to the temporal level track track1 is a file identifier of the representation2, that is, associationId=2 in the representation1; and the value of the associationid of the representation2 corresponding to the temporal level track track2 is a file identifier of the representation1, that is, associationId=1 in the representation2. For another example, the value of the associationid of the representation3 corresponding to the replaceable track track1' is a file identifier of the representation4, that is, associationId=4 in the representation3, and the value of the associationId of the representation4 corresponding to the replaceable track track2' is a file identifier of the representation3, that is, associationId=3 in the representation4. By this way, the associationId can be used for associating the media files including the media frames with the same quality, that is, associating the representation1 and the representation2 as well as the representation3 and the representation4.

In this embodiment, by this way, the media files including the media frames with the same quality can be associated by using association identifiers, so as to determine the way in which the media files are allowed for combination decoding based on the association identifiers. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

It can be understood that the media frames in the media file corresponding to the $i^{th}$ track and the media frames corresponding to the media file indicated by the association identifier corresponding to the $i^{th}$ track are allowed for combination decoding. It can be understood from the above that different representations can be associated by the associationId, where if the representation1 and the representation2 are associated, the media frames in the representation1 and the media frames in the representation2 are allowed for combination decoding; and if the representation3 and the representation4 are associated, the media frames in the representation3 and the media frames in the representation4 are allowed for combination decoding. In some embodiments, the generation of the combination indication information may be achieved by defining a new Preselection (preselection file) using a Preselection tool.

In some embodiments, the temporal level track and the replaceable track correspond to a replaceable level respectively, and media files corresponding to tracks with the same replaceable level form a preselection file. The signaling description file further includes a preselection descriptor, and the preselection descriptor includes a file identifier of each media file in one preselection file.

For example, assuming that the media data is stored in temporal level tracks track1 and track2, the track1 has a replaceable track track1', and the track2 has a replaceable track track2', the replaceable level corresponding to the temporal level tracks track1 and track2 is a level1, the replaceable level corresponding to the replaceable tracks track1' and track2' is a level2, the media file corresponding to the temporal level track track1 is a representation1, the media file corresponding to the temporal level track track2 is a representation2, the media file corresponding to the replaceable track track1' is a representation3, and the media file corresponding to the replaceable track track2' is a representation4. If the representation1 and the representation2 may form a preselection file Preselection1, preselection descriptors corresponding to the preselection file Preselection1 may include 1 and 2 (or Preselection1 and Preselection2). Similarly, if the representation3 and the representation4 may also form a preselection file Preselection2, preselection descriptors corresponding to the preselection file Preselection2 may include 3 and 4 (or Preselection3 and Preselection4).

It can be understood that the media frames in the preselection file corresponding to the file identifier recorded in the preselection descriptor are allowed for combination decoding. For example, if the representation1 and the representation2 may form a preselection file Preselection1, the media frames in the representation1 and the media frames in the representation2 are allowed for combination decoding; and if the representation3 and the representation4 may form a preselection file Preselection2, the media frames in the representation3 and the media frames in the representation4 are allowed for combination decoding.

In this embodiment, by this way, file identifiers recorded in preselection descriptors can be used for distinguishing whether the media files are allowed for combination decoding, so as to determine the way in which the media files are allowed for combination decoding based on file identifiers. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, the signaling description file may also be an SMT signaling file. In a case that one or a plurality of media frames are encapsulated into one track, resource files corresponding to the track are obtained. The combination indication information includes a temporal level combination resource descriptor, one resource file corresponds to one temporal level combination resource descriptor, and the value of one temporal level combination resource descriptor represents a file identifier of the resource file corresponding to the temporal level combination resource descriptor. It can be understood that the media frames in the resource files corresponding to the temporal level combination resource descriptors with the same value are allowed for combination decoding.

In this embodiment, by using the file identifier of the resource file as the value of the temporal level combination resource descriptor, the value of the temporal level combination resource descriptor can be determined, so as to determine whether the resource file is allowed for combination decoding based on the value of the temporal level combination resource descriptor. As a result, the media files allowed for combination decoding can be obtained, so as to select appropriate media files for consumption decoding, thereby achieving the purpose of accurately requesting corresponding media frames without the need to request all media files, so as to save the transmission bandwidth.

In some embodiments, the syntax and semantics of the temporal level combination resource descriptor may be shown in Table 3:

TABLE 3

Syntax and semantics of temporal level combination resource descriptor

| Syntax | Bit | Remark |
| --- | --- | --- |
| Temporal_level_combination _descriptor( ) { | | |
| descriptor_tag | 16 | Unsigned integer |
| descriptor_length | 32 | Unsigned integer |
| combination_id | 8 | Unsigned integer |
| } | | |

As shown in Table 3, descriptor_tag is an identifier of the temporal level combination resource descriptor and is used for marking the type of the descriptor. Descriptor_length is used for indicating the length of the identifier of the temporal level combination resource descriptor, and the unit is byte. Combination_id represents a temporal level combination identifier. When the content playback device needs to combine a plurality of media frames corresponding to different temporal levels, only one or a plurality of representations can be selected from a set of media files including the same combination_id for requesting.

In step S402, one or a plurality of media files is requested according to the combination indication information in the signaling description file, and perform combination decoding on each requested media file.

In an example, the content playback device can request at least two media files from M media files according to the values of the combination identification elements in the temporal level combination descriptors in the combination indication information, and perform combination decoding on the requested media files. The values of the combination identification elements in the temporal level combination descriptors corresponding to the decoded media files are the same. The signaling description file may include but is not limited to MPD signaling files, SMT signaling files, and the like.

In this embodiment, whether the media files are allowed for combination consumption can be determined based on the value of the combination identification element, so as to select appropriate media files for consumption decoding, thereby achieving the purpose of accurately requesting corresponding media frames without the need to request all media files, so as to save the transmission bandwidth.

For example, when the combination indication information is a temporal level combination descriptor, the signaling description file received by the content playback device may include the following information:

Representation1: {@temporalLevelId=1; @qualityRanking=0; @combinationId=100}
Representation2: {@temporalLevelId=1; @qualityRanking=1; @combinationId=200}
Representation3: {@temporalLevelId=2; @qualityRanking=0; @combinationId=100}
Representation4: {@temporalLevelId=2; @qualityRanking=1; @combinationId=200}

As can be seen from the previous statement, in the signaling description file, @temporalLevelId in each media file is used for indicating the temporal level information of the media frame. For example, @temporalLevelId=1 may represent that the temporal level of the media frame in the corresponding media file is L1. For another example, @temporalLevelId=2 may represent that the temporal level of the media frame in the corresponding media file is L2. It can be understood that each media file may include media frames of one or a plurality of temporal levels.

@qualityRanking in each media file is used for indicating the quality information of the media frame. For example, @qualityRanking=0 may represent that the quality level corresponding to the media frame in the media file is quality0. For another example, @qualityRanking=1 may represent that the quality level corresponding to the media frame in the media file is quality1.

Of course, @combinationId in each media file refers to a combination identification element of a temporal level combination descriptor, where the media frames in the media files with the same @combinationId are allowed for combination decoding. For example, in the signaling description file, the Representation1 corresponds to @combinationId=100, and the Representation3 corresponds to @combinationId=100. Since the combination identification elements of the Representation1 and the Representation3 are the same, the Representation1 and the Representation3 are allowed for combination decoding. For another example, in the signaling description file, the Representation2 corresponds to @combinationId=200, and the Representation4 corresponds to @combinationId=200. Since the combination identification elements of the Representation2 and the Representation4 are the same, the Representation2 and the Representation4 are allowed for combination decoding.

In some embodiments, the content playback device can request one or a plurality of media files according to the signaling description file based on the own needs, network conditions or decoding ability, and perform combination decoding on the requested media files. From the above analysis, it can be seen that after obtaining the signaling description file, the content playback device can determine that the media files allowed for combination decoding may be the Representation1+Representation3 or the Representation2+Representation4 according to the combination indication information (the combination identification element of the temporal level combination descriptor) in the signaling description file.

In some embodiments, if the content playback device is in better network conditions or has a stronger decoding ability, the content playback device may decode media frames with higher quality levels (assuming that the quality1 is higher than the quality0), thus, the content playback device may request the Representation2+Representation4 for combination decoding. If the content playback device is in poor network conditions or has a weaker decoding ability, the content playback device needs to decode media frames with low quality levels, thus, the content playback device may request the Representation1+Representation3 for combination decoding. By this way, after the content playback device is supported to obtain the signaling description file, the media files allowed for combination decoding are obtained in advance according to the combination indication information in the signaling description file, thereby achieving the purpose of accurately requesting appropriate media frames, so as to save the transmission bandwidth and improve the efficiency of data processing.

In some embodiments, when relevant constraints are imposed on the encapsulated track and the corresponding replaceable track in the form of text in standards, the signaling description file received by the content playback device may include the following information:

Representation1: {@temporalLevelId=1; @qualityRanking=0}
Representation2: {@temporalLevelId=1; @qualityRanking=1}
Representation3: {@temporalLevelId=2; @qualityRanking=0}
Representation4: {@temporalLevelId=2; @qualityRanking=1}

In this case, since the corresponding tracks of the Representation1 and the Representation3 are replaceable tracks, the content playback device can determine the media files for combination decoding based on quality identifiers (@qualityRanking), that is, the content playback device can perform combination decoding on the Representation1 and Representation3 of which the corresponding quality identifiers are both 0, or can perform combination decoding on the Representation2 and Representation4 of which the corresponding quality identifiers are both 1.

In some embodiments, when relevant constraints are imposed on the encapsulated track and the corresponding replaceable track in the form of text in standards, the signaling description file received by the content playback device may include the following information:

Representation1: {@temporalLevelId=1; @qualityRanking=0; @associationId=3; @associationType='gtsg'}
Representation2: {@temporalLevelId=1; @qualityRanking=1; @associationId=4; @associationType='xxx'}
Representation3: {@temporalLevelId=2; @qualityRanking=0; @associationId=1; @associationType='gtsg'}
Representation4: {@temporalLevelId=2; @qualityRanking=1; @associationId=2; @associationType='xxx'}

The content playback device can determine the media files for combination decoding based on quality identifiers (@qualityRanking), that is, the content playback device can determine to perform combination decoding on the Representation1 and the Representation3 based on the value of @associationId in the Representation), and the like.

In some embodiments, the preselection descriptor received by the content playback device will directly record the identifiers of media files, and the content playback device may request one or a plurality of media files directly according to the preselection descriptor and perform combination decoding on each requested video text. For example, the preselection descriptor may directly record the identifiers of the Representation1 and the Representation3 or the identifiers of the Representation2 and the Representation4, so that the content playback device may determine to perform combination decoding on the Representation1 and the Representation3 or perform combination decoding on the Representation2 and the Representation4 based on the preselection descriptor.

In the embodiments of this disclosure, the content production device is supported to encapsulate N media frames of media data into M tracks to obtain media files corresponding to each track, where the quality of the media frames encapsulated into a same track is the same, and at least two tracks in the M tracks include media frames with the same quality. Then, the content production device generates combination indication information according to the media files allowed for combination decoding, and adds the combination indication information to the signaling description file. After obtaining the signaling description file transmitted by the content production device, the content playback device can obtain the media files allowed for combination decoding in M media files in advance according to the combination indication information in the signaling description file. Then, the content playback device can select appropriate media files for consumption decoding from the media files allowed for combination decoding according to the combination indication information. Obviously, the content playback device can obtain the combination restriction information of media files allowed for combination decoding in advance, and then can request corresponding media files for consumption decoding according to the combination restriction information, thereby achieving the purpose of accurately requesting corresponding media frames without the need to request all media files, so as to save the transmission bandwidth.

Figure 5:
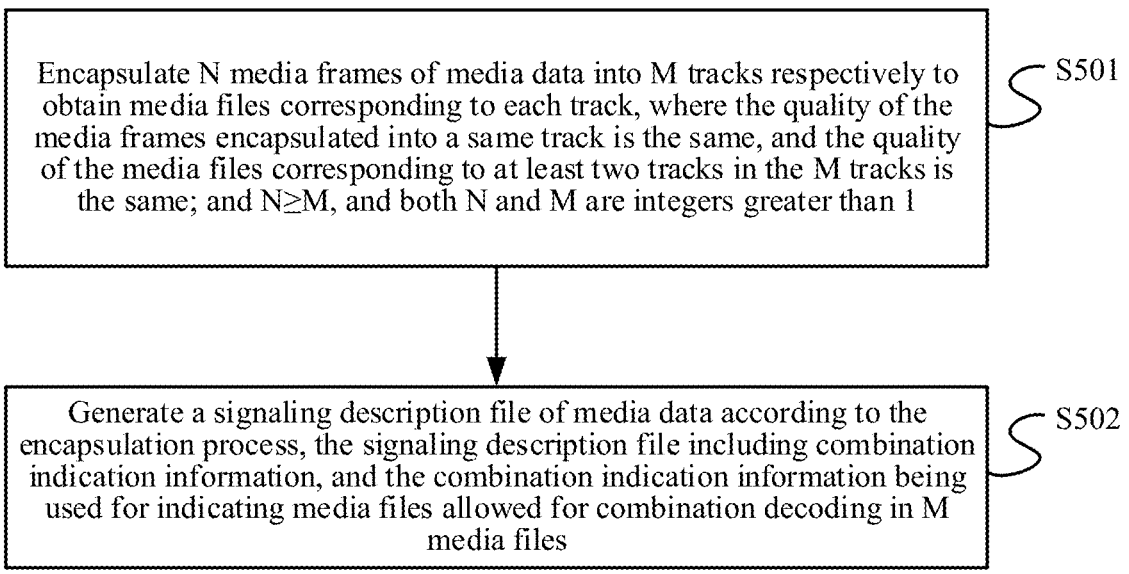
FIG. 5 shows a flowchart of another data processing method provided in an exemplary embodiment of this disclosure.

Referring to FIG. 5, FIG. 5 shows a flowchart of another data processing method of media data provided in an exemplary embodiment of this disclosure. The method may be performed by the foregoing content production device (also known as coding device). Specifically, the content production device may be a server or a terminal device. The server may be an independent server, a server cluster or distributed system composed of a plurality of servers, or a cloud server that provides basic cloud computing services, such as cloud services, cloud databases, cloud computing, cloud functions, cloud storage, network services, cloud communications, middleware services, and artificial intelligence platforms. As shown in FIG. 5, the method includes the following steps S501 to S502:

In step S501, N media frames of media data are encapsulated into M tracks respectively to obtain media files corresponding to each track, where the quality of the media frames encapsulated into a same track is the same, and the quality of the media files corresponding to at least two tracks in the M tracks is the same; and N≥M, and both N and M are integers greater than 1.

In step S502, a signaling description file of media data is generated according to the encapsulation process, the signaling description file including combination indication information, and the combination indication information being used for indicating media files allowed for combination decoding in M media files.

In some embodiments, the N media frames may consist of a plurality of media frames with different quality. For a point cloud media, the different quality of corresponding media frames may be reflected in the different components of the media frames, and the components of the media frames in the point cloud media may specifically include attribute components and geometric components. For any two media frames (assuming Frame1 and Frame2), the quality differences between the Frame1 and the Frame2 may include but are not limited to the following situations: (1) The attribute component of the Frame1 is different from the attribute component of the Frame2. For example, the attribute component corresponding to the Frame1 is an attribute1, and the attribute component corresponding to the Frame2 is an attribute2. (2) The geometric component of the Frame1 is different from the geometric component of the Frame2. For example, the geometric component corresponding to the Frame1 is a geometry1, and the geometric component corresponding to the Frame2 is a geometry2. (3) The geometric component and attribute component of the Frame1 are different from the geometric component and attribute component of the Frame2. For example, the geometric component and attribute component corresponding to the Frame1 are the geometry1 and the attribute1 respectively, and the geometric component and attribute component corresponding to the Frame2 are the geometry2 and the attribute2 respectively.

In some embodiments, when media frames with different quality are encapsulated, N media frames are divided into a plurality of temporal levels, and one temporal level includes one or a plurality of media frames; and a media file is obtained after corresponding media frames are encapsulated into a track, and one media file includes media frames of one or a plurality of temporal levels. When generating a signaling description file of media data according to the encapsulation process, the content production device adds a temporal level combination descriptor to the signaling description file. The temporal level combination descriptor is combination indication information in the signaling description file, and the temporal level combination descriptor is used for defining the allowed combination modes between media files of different temporal levels.

In this embodiment, the division of N media frames can be achieved based on temporal levels, and then, the N media frames can be encapsulated on the basis of the division of the N media frames, thereby achieving the acquisition of the media file corresponding to the track after the corresponding media frames are encapsulated into the track. In addition, the temporal level combination descriptor can also be used for achieving the definition of the allowed combination modes between media files of different temporal levels. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, when adding the temporal level combination descriptor to the signaling description file, the content production device adds a corresponding temporal level combination descriptor to each media file in the signaling description file, and the added temporal level combination descriptor includes combination identification elements. The values of the combination identification elements of the temporal level combination descriptors added to the media files allowed for combination decoding by the content production device are the same.

In this embodiment, by enabling the media files to correspond to the temporal level combination descriptors, the combination identification elements in the media files may correspond to the combination identification elements in the temporal level combination descriptors; and by using the values of the combination identification elements for indicating the media files allowed for combination decoding, the media files allowed for combination decoding can be distinguished by the values of the combination identification elements. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, for the temporal level combination descriptor, the content production device may newly add a temporal level combination descriptor to the signaling description file, and take elements in the newly added temporal level combination descriptor as combination identification elements, or may take elements in an existing descriptor in the signaling description file as combination identification elements. It is to be understood that the content production device may encapsulate the temporal level combination descriptor in the Adaptation Set level of the signaling description file, or encapsulate the temporal level combination descriptor in the Representation level of the signaling description file, or encapsulate the temporal level combination descriptor in the Preselection level of the signaling description file.

In this embodiment, by taking the elements in the newly added temporal level combination descriptor, the elements in the existing descriptor and the like as combination identification elements, the combination identification elements can be determined, which is favorable for using the values of the combination identification elements for distinguishing the media files allowed for combination decoding. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, when encapsulating N media frames of media data into M tracks, the content production device can store the media data in a plurality of temporal level tracks. In a case that any one of the temporal level tracks has a replaceable track, the replaceable track of any one of the temporal level tracks can be generated according to target constraint rules, that is, the M tracks include a plurality of temporal level tracks and replaceable tracks corresponding to the plurality of temporal level tracks respectively. Therefore, encapsulating N media frames of media data into M tracks can be understood as encapsulating media frames with the same quality into a plurality of temporal level tracks or replaceable tracks, and the corresponding media frames are encapsulated into the tracks to obtain a media file corresponding to the tracks. For each temporal level track in a plurality of temporal level tracks, the quality of the media frames in the first media file corresponding to a target temporal level track is the same, and for a target replaceable track corresponding to the target temporal level track, the quality of the media frames in the second media file corresponding to the target replaceable track is different from the quality of the media frames in the first media file.

In this embodiment, by generating the corresponding replaceable track according to target constraint rules, the acquisition of the replaceable track can be achieved, which is convenient for providing multiple modes of combination decoding based on a plurality of temporal level tracks and replaceable tracks to achieve the purpose of combination limitation, so as to select appropriate media files for consumption decoding, thereby achieving the purpose of accurately requesting corresponding media frames without the need to request all media files, so as to save the transmission bandwidth.

In some embodiments, when generating a signaling description file of media data according to the encapsulation process, the content production device may further add a corresponding quality identifier to each media file in the signaling description file, and the value of the quality identifier is used for indicating the quality of the corresponding media frame in the corresponding media file, where the temporal level track and the replaceable track correspond to a replaceable level respectively, and tracks with the same replaceable level form a track group.

In this embodiment, by using the value of the quality identifier for indicating the quality of the media frames in the media files, the media files allowed for combination decoding can be distinguished by the value of the quality identifier. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, when generating a signaling description file of media data according to the encapsulation process, the content production device may add a corresponding association identifier and association type identifier to the media file corresponding to the $i^{th}$ track in the signaling description file, where the value of the association identifier is determined by a file identifier of the media file corresponding to the track with the same replaceable level as the $i^{th}$ track, the value of the association type identifier is determined by the type of relationship between corresponding media files, and the value of the association type identifier corresponding to the media file corresponding to the $i^{th}$ track represents the type of a track group where the $i^{th}$ track is located, where i is a positive integer, and i≤M.

In this embodiment, by this way, the media files including the media frames with the same quality can be associated by using association identifiers, so as to determine the way in which the media files are allowed for combination decoding based on the association identifiers. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, the temporal level track and the replaceable track correspond to a replaceable level respectively, and media files corresponding to tracks with the same replaceable level form a preselection file. Then, when generating a signaling description file of media data according to the encapsulation process, the content production device may first add a corresponding preselection descriptor to each media file in the signaling description file, and the value of the preselection descriptor is generated according to the file identifier of each media file in one preselection file, where the signaling description file is a description file for describing media clip information.

In this embodiment, by this way, file identifiers recorded in preselection descriptors can be used for distinguishing whether the media files are allowed for combination decoding, so as to determine the way in which the media files are allowed for combination decoding based on file identifiers. As a result, the media files allowed for combination decoding can be obtained in advance, so as to select appropriate media files for consumption decoding, thereby achieving the purpose of accurately requesting corresponding media frames without the need to request all media files, so as to save the transmission bandwidth.

In some embodiments, if the signaling description file is an SMT signaling, in a case that one or a plurality of media frames are encapsulated into one track, resource files corresponding to the track are obtained, the combination indication information includes a temporal level combination resource descriptor, and one resource file corresponds to one temporal level combination resource descriptor. The content production device may further generate the value of the temporal level combination resource descriptor according to the file identifier of the resource file corresponding to the temporal level combination resource descriptor.

In this embodiment, by using the file identifier of the resource file as the value of the temporal level combination resource descriptor, the value of the temporal level combination resource descriptor can be determined, so as to determine whether the resource file is allowed for combination decoding based on the value of the temporal level combination resource descriptor. As a result, the media files allowed for combination decoding can be obtained, so as to select appropriate media files for consumption decoding, thereby achieving the purpose of accurately requesting corresponding media frames without the need to request all media files, so as to save the transmission bandwidth.

In the embodiments of this disclosure, the content production device is supported to encapsulate N media frames with different quality into M tracks respectively to obtain media files corresponding to each track, where the quality of the media frames encapsulated into a same track is the same, and the quality of the media files corresponding to at least two tracks in the M tracks is the same. Then, according to the encapsulation process of the media frames, the content production device can generate a signaling description file of an immersive media, the signaling description file includes combination indication information, and the combination indication information is used for indicating media files allowed for combination decoding in M media files. Subsequently, after obtaining the signaling description file, the content playback device can request corresponding media files for combination consumption according to the combination indication information in the signaling description file, thereby achieving the purpose of saving the transmission bandwidth.

Figure 6:
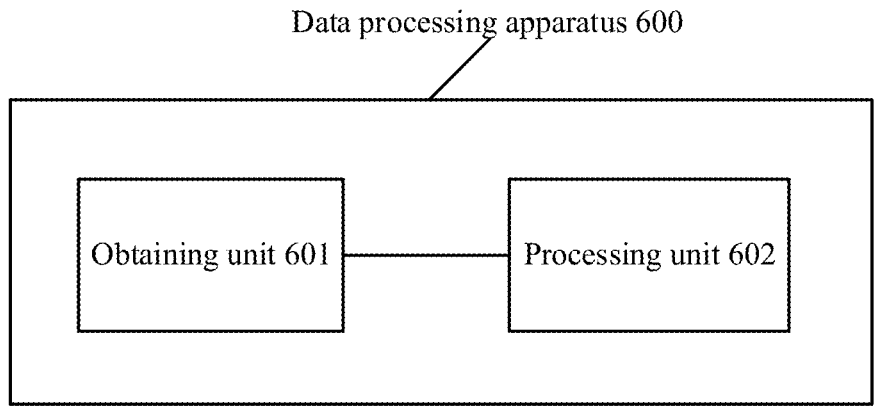
FIG. 6 shows a schematic structural diagram of a data processing apparatus provided in an exemplary embodiment of this disclosure.

In some embodiments, as shown in FIG. 6, a schematic structural diagram of a data processing apparatus is provided. The data processing apparatus 600 may be applied to the content playback device in the media data system corresponding to FIG. 1*a*. The data processing apparatus 600 may be a computer-readable instruction (including program codes) running in a computer device. For example, the data processing apparatus 600 is an application software. The apparatus may be configured to perform the corresponding steps in the methods provided in the embodiments of this disclosure. The media data includes N media frames, and the N media frames are respectively encapsulated into M tracks to obtain media files corresponding to each track; the quality of the media frames encapsulated into a same track is the same, and the quality of the media files corresponding to at least two tracks in the M tracks is the same; and N≥M, and both N and M are integers greater than 1. The data processing apparatus 600 may include an obtaining unit 601 and a processing unit 602.

The obtaining unit 601 is configured to obtain a signaling description file of media data, the signaling description file including combination indication information, and the combination indication information being used for indicating media files allowed for combination decoding in M media files.

The processing unit 602 is configured to request at least two media files according to the combination indication information, and perform combination decoding on each requested media file.

In some embodiments, the N media frames are divided into a plurality of temporal levels, and one temporal level includes one or a plurality of media frames; a media file is obtained after corresponding media frames are encapsulated into a track, and one media file includes media frames of one or a plurality of temporal levels; and the combination indication information includes a temporal level combination descriptor, and the temporal level combination descriptor is used for defining the allowed combination modes between media files of different temporal levels.

In some embodiments, one media file corresponds to one temporal level combination descriptor, and the temporal level combination descriptor includes combination identification elements; and the value of the combination identification element is used for indicating the media file allowed for combination decoding.

In some embodiments, the processing unit 602 requests one or a plurality of media files according to the combination indication information, and performs combination decoding on each requested media file, and is configured to request at least two media files in the M media files according to the value of the combination identification element in the temporal level combination descriptor in the combination indication information, and perform combination decoding on each requested media file, where the values of the combination identification elements in the temporal level combination descriptor corresponding to each requested media file are the same.

In some embodiments, the combination identification elements are elements in a newly added temporal level combination descriptor.

In some embodiments, the combination identification elements are elements in an existing descriptor.

In some embodiments, the temporal level combination descriptor is encapsulated in the Adaptation Set level of the signaling description file.

In some embodiments, the temporal level combination descriptor is encapsulated in the Representation level of the signaling description file.

In some embodiments, the temporal level combination descriptor is encapsulated in the Preselection level of the signaling description file.

In some embodiments, in a case that the media data is stored in a plurality of temporal level tracks and any one of the temporal level tracks has a replaceable track, the any one of the temporal level tracks generates a corresponding replaceable track according to target constraint rules; the M tracks include a plurality of temporal level tracks and replaceable tracks corresponding to the plurality of temporal level tracks respectively; a corresponding media file is obtained after corresponding media frames are encapsulated into a track; and for each temporal level track in a plurality of temporal level tracks, the quality of the media frames in the first media file corresponding to a target temporal level track is the same, and for a target replaceable track corresponding to the target temporal level track, the quality of the media frames in the second media file corresponding to the target replaceable track is different from the quality of the media frames in the first media file.

In some embodiments, the combination indication information includes a quality identifier of each media file; and the value of the quality identifier is used for indicating the quality of the media frames in the media file corresponding to one track, where the media files including the quality identifiers with the same value are allowed for combination decoding.

In some embodiments, the temporal level track and the replaceable track correspond to a replaceable level respectively, and tracks with the same replaceable level form a track group; the combination indication information includes an association identifier and an association type identifier; the value of the association identifier corresponding to the media file corresponding to an $i^{th}$ track is determined by a file identifier of the media file corresponding to the track with the same replaceable level as the $i^{th}$ track, and the value of the association type identifier is used for indicating the type of relationship between corresponding media files; the value of the association type identifier corresponding to the media file corresponding to the $i^{th}$ track represents the type of a track group where the $i^{th}$ track is located, where i is a positive integer, and i≤M; and the media file corresponding to the $i^{th}$ track and the media file indicated by the association identifier corresponding to the $i^{th}$ track are allowed for combination decoding.

In some embodiments, the temporal level track and the replaceable track correspond to a replaceable level respectively, and media files corresponding to tracks with the same replaceable level form a preselection file; and the signaling description file further includes a preselection descriptor, and the preselection descriptor includes a file identifier of each media file in one preselection file, where the preselection file corresponding to the file identifier recorded in the preselection descriptor is allowed for combination decoding.

In some embodiments, the signaling description file is a description file for describing media clip information.

In some embodiments, the signaling description file is an SMT signaling; in a case that one or a plurality of media frames are encapsulated into one track, resource files corresponding to the track are obtained; and the combination indication information includes a temporal level combination resource descriptor, one resource file corresponds to one temporal level combination resource descriptor, and the value of one temporal level combination resource descriptor represents a file identifier of the resource file corresponding to the temporal level combination resource descriptor, where the resource files corresponding to the temporal level combination resource descriptors with the same value are allowed for combination decoding.

In the embodiments of this disclosure, the content production device is supported to encapsulate N media frames of media data into M tracks respectively to obtain media files corresponding to each track, where the quality of the media frames encapsulated into a same track is the same, and the quality of the media files corresponding to at least two tracks in the M tracks is the same. Then, the content production device generates combination indication information according to the media files allowed for combination decoding, and adds the combination indication information to the signaling description file. After obtaining the signaling description file transmitted by the content production device, the content playback device can obtain the media files allowed for combination decoding in M media files in advance according to the combination indication information in the signaling description file. Then, the content playback device can select appropriate media files for consumption decoding from the media files allowed for combination decoding according to the combination indication information. Obviously, the content playback device can obtain the combination restriction information of media files allowed for combination decoding in advance, and then can request corresponding media files for consumption decoding according to the combination restriction information, thereby achieving the purpose of accurately requesting corresponding media frames without the need to request all media files, so as to save the transmission bandwidth.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this disclosure, the execution sequence of the steps is not strictly limited, and the steps may be performed in other sequences. Moreover, at least part of the steps in the flowchart of each embodiment may include a plurality of steps or a plurality of stages. The steps or stages are not necessarily performed at the same moment but may be performed at different moments. The steps or stages are not necessarily performed in sequence, but may be performed in turn or alternately with other steps or at least part of the steps or stages in other steps.

Figure 7:
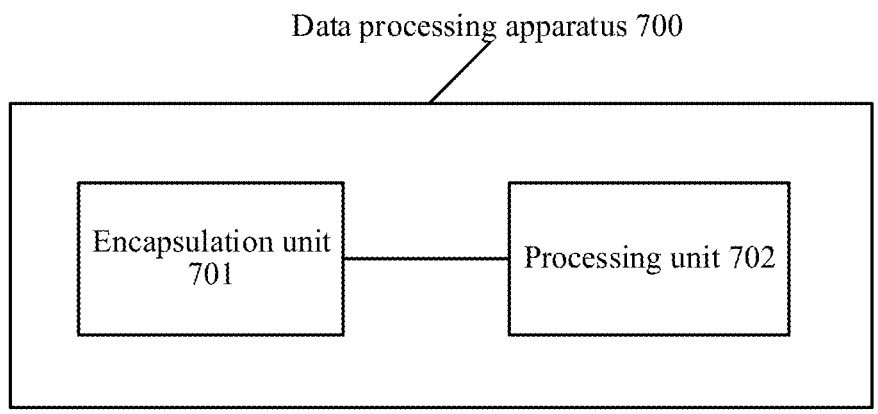
FIG. 7 shows a schematic structural diagram of another data processing apparatus provided in an exemplary embodiment of this disclosure.

Referring to FIG. 7, FIG. 7 shows a schematic structural diagram of another data processing apparatus provided in an exemplary embodiment of this disclosure. The data processing apparatus 700 may be applied to the content production device in the media data system corresponding to FIG. 1a. The data processing apparatus 700 may be a computer-readable instruction (including program codes) running in a computer device. For example, the data processing apparatus 700 is an application software. The apparatus may be configured to perform the corresponding steps in the methods provided in the embodiments of this disclosure. The data processing apparatus 700 may include an encapsulation unit 701 and a processing unit 702.

The encapsulation unit 701 is configured to encapsulate N media frames of media data into M tracks respectively to obtain media files corresponding to each track, where the quality of the media frames encapsulated into a same track is the same, and the quality of the media files corresponding to at least two tracks in the M tracks is the same; N≥M, and both N and M are integers greater than 1.

The processing unit 702 is configured to generate a signaling description file of the media data according to the encapsulation process, the signaling description file including combination indication information, and the combination indication information being used for indicating media files allowed for combination decoding in M media files.

In some embodiments, the N media frames are divided into a plurality of temporal levels, and one temporal level includes one or a plurality of media frames; a media file is obtained after corresponding media frames are encapsulated into a track, and one media file includes media frames of one or a plurality of temporal levels; and the processing unit 702 generates a signaling description file of the media data according to the encapsulation process, and is configured to add the temporal level combination descriptor to the signaling description file, the temporal level combination descriptor being combination indication information in the signaling description file, and the temporal level combination descriptor being used for defining the allowed combination modes between media files of different temporal levels.

In some embodiments, the processing unit 702 adds the temporal level combination descriptor to the signaling description file, and is configured to add a corresponding temporal level combination descriptor for each media file in the signaling description file, the temporal level combination descriptor including combination identification elements, where the values of the combination identification elements of the temporal level combination descriptors added to the tracks corresponding to the media files allowed for combination decoding are the same.

In some embodiments, the processing unit 702 is further configured to newly add a temporal level combination descriptor to the signaling description file, and take elements in the newly added temporal level combination descriptor as the combination identification elements.

In some embodiments, the processing unit 702 is further configured to take elements in an existing descriptor in the signaling description file as the combination identification elements.

In some embodiments, the processing unit 702 is further configured to encapsulate the temporal level combination descriptor in the Adaptation Set level of the signaling description file. In some embodiments, the processing unit 702 is further configured to encapsulate the temporal level combination descriptor in the Representation level of the signaling description file.

In some embodiments, the processing unit 702 is further configured to encapsulate the temporal level combination descriptor in the Preselection level of the signaling description file.

In some embodiments, the processing unit 702 encapsulates N media frames of media data into M tracks respectively, and is configured to generate a replaceable track of any one of the temporal level tracks according to target constraint rules in a case that the media data is stored in a plurality of temporal level tracks and any one of the temporal level tracks has a replaceable track, where the M tracks include a plurality of temporal level tracks and replaceable tracks corresponding to the plurality of temporal level tracks respectively; and encapsulate media frames with the same quality into the plurality of temporal level tracks or the replaceable tracks, and encapsulate the corresponding media frames into the tracks to obtain a media file corresponding to the tracks, where for each temporal level track in a plurality of temporal level tracks, the quality of the media frames in the first media file corresponding to a target temporal level track is the same, and for a target replaceable track corresponding to the target temporal level track, the quality of the media frames in the second media file corresponding to the target replaceable track is different from the quality of the media frames in the first media file.

In some embodiments, the processing unit 702 generates a signaling description file of the media data according to the encapsulation process, and is configured to add a corresponding quality identifier to each media file in the signaling description file, the value of the quality identifier being used for indicating the quality of the corresponding media frame in the corresponding media file.

In some embodiments, the temporal level track and the replaceable track correspond to a replaceable level respectively, and tracks with the same replaceable level form a track group. The processing unit 702 generates a signaling description file of the media data according to the encapsulation process, and is configured to add a corresponding association identifier and association type identifier to the media file corresponding to the $i^{th}$ track in the signaling description file, where the value of the association identifier is determined by a file identifier of the media file corresponding to the track with the same replaceable level as the $i^{th}$ track; and the value of the association type identifier is determined by the type of relationship between corresponding media files, and the value of the association type identifier corresponding to the media file corresponding to the $i^{th}$ track represents the type of a track group where the $i^{th}$ track is located, where i is a positive integer, and i≤M.

In some embodiments, the temporal level track and the replaceable track correspond to a replaceable level respectively, and media files corresponding to tracks with the same replaceable level form a preselection file. The processing unit 702 generates a signaling description file of the media data according to the encapsulation process, and is configured to add a corresponding preselection descriptor to each media file in the signaling description file, the value of the preselection descriptor being generated according to the file identifier of each media file in one preselection file.

In some embodiments, the signaling description file is a description file for describing media clip information.

In some embodiments, the signaling description file is an SMT signaling. In a case that one or a plurality of media frames are encapsulated into one track, resource files corresponding to the track are obtained, the combination indication information includes a temporal level combination resource descriptor, and one resource file corresponds to one temporal level combination resource descriptor. The processing unit 702 is further configured to generate the value of the temporal level combination resource descriptor according to the file identifier of the resource file corresponding to the temporal level combination resource descriptor.

In the embodiments of this disclosure, the content production device is supported to encapsulate N media frames with different quality into M tracks to obtain media files corresponding to each track, where the quality of the media frames encapsulated into a same track is the same, and at least two tracks in the M tracks include media frames with the same quality. Then, according to the encapsulation process of the media frames, the content production device can generate a signaling description file of an immersive media, the signaling description file includes combination indication information, and the combination indication information is used for indicating media files allowed for combination decoding in M media files. Subsequently, after obtaining the signaling description file, the content playback device can request corresponding media files for combination consumption according to the combination indication information in the signaling description file, thereby achieving the purpose of saving the transmission bandwidth.

Each module in the foregoing apparatus may be implemented fully or partially by software, hardware and a combination of software and hardware. Each of the foregoing modules may be embedded in one or a plurality of processors in a computer device in the form of hardware or independent of one or a plurality of processors in a computer device, or may be stored in a memory in a computer device in the form of software, so that one or a plurality of processors may invoke and execute the operations corresponding to each of the foregoing modules. In addition, the data processing apparatus of media data provided in the foregoing embodiment belongs to the same concept as the embodiment of the data processing method of media data. For specific implementation processes, refer to the embodiment of the data processing method of media data, and details are not described herein again.

Figure 8:
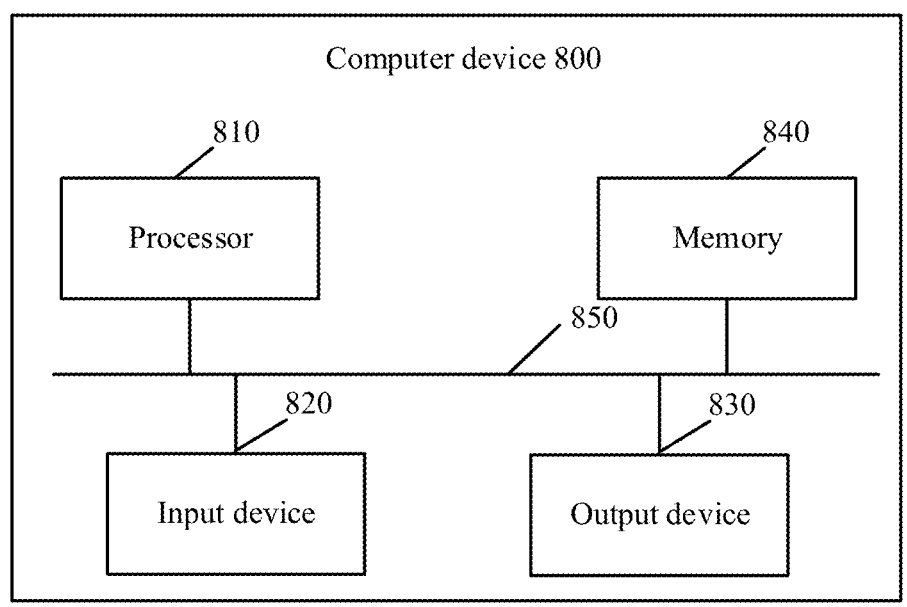
FIG. 8 shows a schematic structural diagram of a computer device provided in an exemplary embodiment of this disclosure.

Referring to FIG. 8, FIG. 8 shows a schematic structural diagram of a computer device provided in an exemplary embodiment of this disclosure. The computer device may be the foregoing content playback device. The computer device 800 is configured to perform the steps performed by the computer device in the foregoing method embodiment. The computer device 800 includes processing circuitry (such as one or a plurality of processors 810), one or a plurality of input devices 820, one or a plurality of output devices 830 and a memory 840. The foregoing one or plurality of processors 810, input devices 820, output devices 830 and memory 840 are connected through a bus 850. The memory 840 is configured to store computer-readable instructions. The computer-readable instructions include program instructions. The program instructions are executed by one or a plurality of processors 810 to implement the data processing method of media data provided in the method embodiments of this disclosure.

In some embodiments, this disclosure further provides one or a plurality of computer-readable storage mediums, the computer-readable storage medium stores at least one computer-readable instruction, and the computer-readable instruction includes program instructions. When executing the foregoing program instructions, a processor may perform the data processing method of media data in the corresponding embodiment above, which will not be repeated here. For technical details that are not disclosed in the embodiments of the computer-readable storage medium involved in this disclosure, refer to the descriptions of the method embodiments of this disclosure. As an example, the program instructions may be executed on a computer device, on multiple computer devices at the same location, or on multiple computer devices which are distributed in multiple locations and interconnected by means of a communication network.

According to one aspect of this disclosure, a computer program product or a computer-readable instruction is provided. The computer program product or the computer-readable instruction includes computer-readable instruction codes, and the computer-readable instruction codes are stored in a computer-readable storage medium. A processor of a computer device reads the computer-readable instruction codes from the computer-readable storage medium, and the processor executes the computer-readable instruction codes, so that the computer device may perform the data processing method of media data in the corresponding embodiment above, which will not be repeated here.

All or some procedures in the methods in the foregoing embodiments may be implemented by computer-readable instructions instructing relevant hardware. The foregoing program may be stored in a computer-readable storage medium, such as a non-transitory computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The technical features in the foregoing embodiments may be combined in other manners. For concise description, not all possible combinations of the technical features in the foregoing embodiments are described. However, provided that combinations of the technical features do not conflict with each other, the combinations of the technical features are considered as falling within the scope described in this specification.

The foregoing embodiments merely express several exemplary implementations of this disclosure. The specific descriptions should not be understood as limitations to the scope of this disclosure. Other embodiments, including modifications and improvements, fall within the scope of this disclosure.

What is claimed is:

1. A method for processing media data, the method comprising:
   receiving signaling description information of the media data, the media data including N media frames of a plurality of qualities that are encapsulated into M tracks to obtain a media file corresponding to each of the M tracks, the media frames encapsulated into a same track of the M tracks having a same quality of the plurality of qualities, the signaling description information including combination indication information that indicates the media files allowed for combination decoding in the M media files, the combination indication information including, for each of the M media files, a quality identifier element that indicates the quality of the media frames in the respective media file and a combination identification element that indicates whether the combination decoding is allowed for the respective media file;

obtaining at least two media files associated with identical quality identifier elements and identical combination identification elements according to the combination indication information; and performing the combination decoding on the obtained at least two media files.

2. The method according to claim 1, wherein
the N media frames are divided into a plurality of temporal levels,
each of the M media files includes a subset of the N media frames divided into one or more of the plurality of temporal levels; and
the combination indication information includes temporal level combination descriptor information that indicates allowed combination modes between the media files of different temporal levels.

3. The method according to claim 2, wherein
each of the M media files corresponds to a temporal level combination descriptor including the combination identification element.

4. The method according to claim 3, wherein the combination identification elements are elements in a newly added temporal level combination descriptor.

5. The method according to claim 3, wherein the combination identification elements are elements in an existing descriptor.

6. The method according to claim 1, wherein
when the media data is stored in a plurality of temporal level tracks, at least one of the temporal level tracks is associated with a corresponding replaceable track according to target constraint rules;
the M tracks include the plurality of temporal level tracks and the at least one replaceable track;
a corresponding media file of the media files is obtained after the corresponding media frames of the N media frames are encapsulated into a track of the M tracks; and
for each temporal level track in the plurality of temporal level tracks, the quality of the media frames in a first media file corresponding to a target temporal level track is the same, and for a target replaceable track corresponding to the target temporal level track, the quality of the media frames in a second media file corresponding to the target replaceable track is different from the quality of the media frames in the first media file.

7. The method according to claim 6, wherein
the temporal level track and the replaceable track correspond to a replaceable level respectively, and tracks with the same replaceable level form a track group,
the combination indication information includes an association identifier and an association type identifier;
a value of the association identifier corresponding to the media file corresponding to an $i^{th}$ track is determined by a file identifier of the media file corresponding to the track with a same replaceable level as the $i^{th}$ track,
the value of the association type identifier indicates a type of relationship between corresponding media files,
the value of the association type identifier corresponding to the media file corresponding to the $i^{th}$ track indicates a type of a track group where the $i^{th}$ track is located, i being less than M, and
the combination decoding of the media file corresponding to the $i^{th}$ track and the media file indicated by the association identifier corresponding to the $i^{th}$ track is allowed.

8. The method according to claim 6, wherein
the temporal level track and the replaceable track correspond to a replaceable level respectively, and the media files corresponding to the tracks with the same replaceable level form a preselection file,
the signaling description information includes a preselection descriptor, the preselection descriptor indicating a file identifier of each media file in one preselection file, and
the combination decoding of the preselection file corresponding to the file identifier indicated by the preselection descriptor is allowed.

9. The method according to claim 1, wherein
the signaling description information is included in smart media transport (SMT) signaling,
when at least one of the media frames is encapsulated into one track, resource files corresponding to the one track are obtained,
the combination indication information includes a temporal level combination resource descriptor for each of the resource files,
the temporal level combination resource descriptor of each of the resources files indicates a file identifier of the respective resource file, and
the combination decoding of the resource files corresponding to the temporal level combination resource descriptors with a same file identifier are allowed.

10. A method for processing media data, comprising:
encapsulating N media frames of media data of a plurality of qualities into M tracks to obtain a media file corresponding to each of the M tracks, the media frames encapsulated into a same track of the M tracks having a same quality of the plurality of qualities; and
generating signaling description information of the media data according to the encapsulation of the N media frames of the media data, the signaling description information including combination indication information that indicates the media files allowed for combination decoding in the M media files, the combination indication information including, for each of the M media files, a quality identifier element that indicates the quality of the media frames in the respective media file and a combination identification element that indicates whether the combination decoding is allowed for the respective media file is permitted to participate in the combination decoding, the media files associated with identical quality identifier elements and identical combination identification elements.

11. The method according to claim 10, wherein
the N media frames are divided into a plurality of temporal levels,
each of the M media files includes a subset of the N media frames divided into one or more of the plurality of temporal levels; and
the generating the signaling description information includes adding temporal level combination descriptor information to the signaling description information, the temporal level combination descriptor information indicating allowed combination modes between the media files of different temporal levels.

12. The method according to claim 11, wherein the adding the temporal level combination descriptor information to the signaling description information comprises:
adding a temporal level combination descriptor for each of the media files in the signaling description information, the temporal level combination descriptor including the combination identification element.

13. The method according to claim 10, wherein the encapsulating the N media frames comprises:
- generating a replaceable track of at least one of a plurality of temporal level tracks according to target constraint rules when the media data is stored in the plurality of temporal level tracks;
- the M tracks including the plurality of temporal level tracks and the at least one replaceable track;
- encapsulating the media frames with a same quality into the plurality of temporal level tracks or the at least one replaceable track; and
- encapsulating the corresponding media frames into the tracks to obtain a media file corresponding to the tracks, for each temporal level track in the plurality of temporal level tracks, the quality of the media frames in a first media file corresponding to a target temporal level track is the same, and for a target replaceable track corresponding to the target temporal level track, the quality of the media frames in a second media file corresponding to the target replaceable track is different from the quality of the media frames in the first media file.

14. The method according to claim 13, wherein
the temporal level track and the replaceable track correspond to a replaceable level respectively, and tracks with the same replaceable level form a track group,
the generating the signaling description information includes adding a corresponding association identifier and association type identifier to the media file corresponding to an $i^{th}$ track in the signaling description information,
a value of the association identifier is determined by a file identifier of the media file corresponding to the track with the same replaceable level as the $i^{th}$ track,
the value of the association type identifier is determined by a type of relationship between corresponding media files, and
the value of the association type identifier corresponding to the media file corresponding to the $i^{th}$ track indicates a type of a track group where the $i^{th}$ track is located, i being less than M.

15. The method according to claim 13, wherein
the temporal level track and the replaceable track correspond to a replaceable level respectively, and the media files corresponding to the tracks with the same replaceable level form a preselection file; and
the generating the signaling description information includes adding a corresponding preselection descriptor to each of the media files in the signaling description information, a value of the preselection descriptor being generated according to a file identifier of the respective media file.

16. The method according to claim 10, wherein
the signaling description information is included in smart media transport (SMT) signaling,
when at least one of the media frames is encapsulated into one track, resource files corresponding to the one track are obtained,
the combination indication information includes a temporal level combination resource descriptor for each of the resource files, and
the method further comprises:
- generating a value of the temporal level combination resource descriptor for each of the resource files according to a file identifier of the respective resource file corresponding to the temporal level combination resource descriptor.

17. A data processing apparatus of media data, comprising:
processing circuitry is configured to:
- receive signaling description information of the media data, the media data including N media frames of a plurality of qualities that are encapsulated into M tracks to obtain a media file corresponding to each of the M tracks, the media frames encapsulated into a same track of the M tracks having a same quality of the plurality of qualities, the signaling description information including combination indication information that indicates the media files allowed for combination decoding in the M media files, the combination indication information including, for each of the M media files, a quality identifier element that indicates the quality of media frames in the respective media file and a combination identification element that indicates whether the combination decoding is allowed for the respective media file;
- obtain at least two media files associated with identical quality identifier elements and identical combination identification elements according to the combination indication information; and
- perform the combination decoding on the obtained at least two media files.

* * * * *